United States Patent
Kang

(10) Patent No.: US 12,075,277 B2
(45) Date of Patent: Aug. 27, 2024

(54) METHOD OF PROCESSING NETWORK SLICE BASED CONGESTION, DEVICE AND SYSTEM THEREOF

(71) Applicant: VIVO MOBILE COMMUNICATION CO., LTD., Chang'an Dongguan (CN)

(72) Inventor: Yanchao Kang, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 100 days.

(21) Appl. No.: 17/728,455

(22) Filed: Apr. 25, 2022

(65) Prior Publication Data

US 2022/0248254 A1  Aug. 4, 2022

Related U.S. Application Data

(63) Continuation of application No. 16/630,689, filed as application No. PCT/CN2018/094810 on Jul. 6, 2018, now Pat. No. 11,356,886.

(30) Foreign Application Priority Data

Jul. 12, 2017 (CN) .......................... 201710567590.X

(51) Int. Cl.
*H04W 28/02* (2009.01)
*H04W 28/04* (2009.01)
(Continued)

(52) U.S. Cl.
CPC ... *H04W 28/0247* (2013.01); *H04W 28/0289* (2013.01); *H04W 28/04* (2013.01); *H04W 28/12* (2013.01); *H04W 36/0011* (2013.01)

(58) Field of Classification Search
CPC .......... H04L 47/28; H04L 47/78; H04W 8/04; H04W 28/0247; H04W 28/0289;
(Continued)

(56) References Cited

U.S. PATENT DOCUMENTS

2013/0258925 A1* 10/2013 Sahu ..................... H04W 76/00
370/311
2017/0071021 A1* 3/2017 Jin ......................... H04W 76/27
(Continued)

FOREIGN PATENT DOCUMENTS

CN  106210042 A  12/2016
CN  106657194 A  5/2017
(Continued)

OTHER PUBLICATIONS

First Non-Final Office Action related to U.S. Appl. No. 16/630,689; reported on Jan. 25, 2021.
First Chinese Office Action related to Application No. 201710567590.X; reported on Jan. 10, 2020.
Extended European Search Report related to Application No. 18831039.5; reported on Apr. 30, 2020.
(Continued)

*Primary Examiner* — Khoa Huynh
(74) *Attorney, Agent, or Firm* — von Briesen & Roper, s.c.

(57) ABSTRACT

A method of processing a network slice based congestion, a device and a system thereof are provided. The method includes: receiving a message sent by a network including slice congestion information; and backing off a target network slice corresponding to the slice congestion information, according to the slice congestion information.

20 Claims, 17 Drawing Sheets

(51) Int. Cl.
*H04W 28/12* (2009.01)
*H04W 36/00* (2009.01)

(58) Field of Classification Search
CPC . H04W 28/04; H04W 28/12; H04W 36/0011; H04W 36/06
See application file for complete search history.

(56) References Cited

U.S. PATENT DOCUMENTS

| | | | | |
|---|---|---|---|---|
| 2018/0262979 A1* | 9/2018 | Wang | .................... | H04W 24/02 |
| 2018/0324877 A1* | 11/2018 | Tiwari | .................. | H04W 76/18 |
| 2019/0223093 A1* | 7/2019 | Watfa | .................... | H04W 36/24 |
| 2019/0246334 A1* | 8/2019 | Wang | .................... | H04W 48/16 |
| 2019/0313473 A1* | 10/2019 | Kim | ...................... | H04W 48/02 |

FOREIGN PATENT DOCUMENTS

| | | |
|---|---|---|
| CN | 109565742 A | 4/2019 |
| WO | 2017080518 A1 | 5/2017 |

OTHER PUBLICATIONS

International Search Report and Written Opinion related to Application No. PCT/CN2018/094810; reported on Sep. 25, 2018.
R2-1700998, Source: Xiaomi "PRACH partitioning, access and congestion control Consideration for Network Slicing", Agenda Item: 10.4, Document for: Discussion and Decision, 3GPP TSG RAN WG2 #97, Athens, Greece, Feb. 13-Feb. 17, 2017.
S2-162981, Source: Huawei, HISilicon "UE Slice Association/Overload control Procedure", Agenda Item: 6.10.1, Document for: Approval, Release: NexGen/Rel-14, 3GPP TSG SA WG2 Meeting #115, May 23-27, 2016, Nanjing, China.
S2-163116, Source: Huawei, HISilicon "UE Slice Association/Overload control Procedure", Agenda Item: 6.10.1, Document for: Approval, Release: NexGen/Rel-14, 3GPP TSG SA WG2 Meeting #115, May 23-27, 2016. Nanjing, China.
S2-164548, Source: LG Electronics "Congestion control for session management (SM)", Agenda Item: 6.10.4, Document for: Approval, Release: FS_NexGen / Rel-14, SA WG2 Meeting #116bis, Aug. 29-Sep. 2, 2016, Sanya, China.

* cited by examiner

METHOD OF PROCESSING NETWORK SLICE BASED CONGESTION, DEVICE AND SYSTEM THEREOF

CROSS-REFERENCE TO RELATED APPLICATION

This application claims the benefit of and is a continuation application of U.S. patent application Ser. No. 16/630,689 filed on Jan. 13, 2020 which is the U.S. national phase of PCT Application PCT/CN2018/094810 filed on Jul. 6, 2018, which claims a priority of priority to Chinese Patent Application No. 201710567590.X, filed on Jul. 12, 2017, which is incorporated herein by reference in its entirety.

TECHNICAL FIELD

The present disclosure relates to the field of communications technologies, and in particular, to a method of processing a network slice based congestion, a device and a system thereof.

BACKGROUND

Network slicing is a core technology of future communication systems (such as 5G systems). Network slicing allows operators to flexibly and dynamically provide multiple different types of virtual network services on the same network infrastructure.

Because the resources of different network slices in the network are independent, different network slices may be in different congestion situations. For example, a user terminal accesses a network slice 1 and a network slice 2 at the same time, where the network slice 1 is congested and the network slice 2 is able to provide services normally, the network slice based congestion may be aggravated if the user terminal access to the network slice 1.

SUMMARY

A method of processing a network slice based congestion, a device and a system thereof are provided in some embodiments of the present disclosure, to solve the technical issue of aggravated network slice based congestion.

In a first aspect, a method of processing a network slice based congestion is provided in some embodiments of the present disclosure, performed by a user terminal, including:
sending an access stratum, AS, message to a base station, wherein the AS message comprises a Non-access stratum, NAS, message and access stratum parameters, wherein the access stratum parameters comprise slice information of a target network slice;
receiving an AS reject message sent by the base station, wherein the AS reject message comprises indication information indicating that the target network slice is congested and a backoff time; and
backing off a target network slice.

In a second aspect, a method of processing a network slice based congestion is provided in some embodiments of the present disclosure, performed by a base station, including:
receiving an access stratum, AS, message sent by a user terminal, wherein the AS message comprises an NAS message and an access parameter, and the access parameter comprises slice information of a target network slice; and
sending an AS reject message to the user terminal, wherein the AS reject message comprises indication information indicating that the target network slice is congested and a backoff time.

In a third aspect, a user terminal, comprising: a memory, a processor and a program for processing a network slice based congestion stored in the memory and executable on the processor, wherein the program for processing the network slice based congestion is executed by the processor to perform the method of processing a network slice based congestion in the first aspect.

In a fourth aspect, a base station, comprising: a memory, a processor and a program for processing a network slice based congestion stored in the memory and executable on the processor, wherein the program for processing the network slice based congestion is executed by the processor to perform the method of processing a network slice based congestion in the second aspect.

BRIEF DESCRIPTION OF THE DRAWINGS

In order to describe the technical solutions of the embodiments of the present disclosure more clearly, the drawings used in the description of the embodiments of the present disclosure are briefly introduced below. Obviously, the drawings in the following description are merely some embodiments of the present disclosure. For those of ordinary skill in the art, other drawings can be obtained based on these drawings without creative word.

DETAILED DESCRIPTION

In the following, the technical solutions in the embodiments of the present disclosure will be clearly and completely described with reference to the drawings in the embodiments of the present disclosure. Obviously, the described embodiments are some of the present disclosure, but not all of them. Based on the embodiments of the present disclosure, all other embodiments obtained by a person of ordinary skill in the art without creative work shall fall within the scope of the present disclosure.

Figure 1:
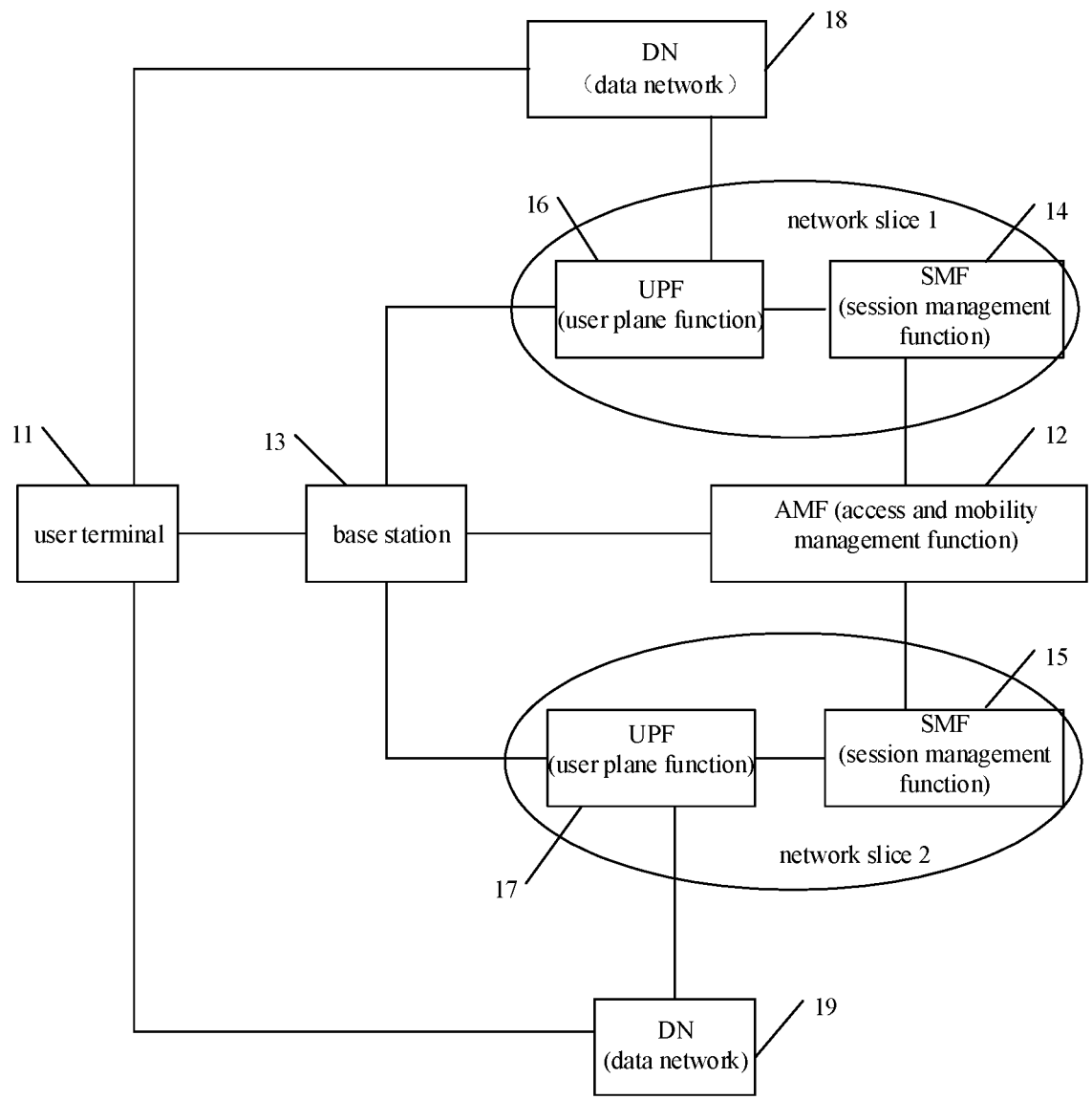
FIG. 1 is a schematic view of a system for processing network slice based congestion in some embodiments of the present disclosure.

Referring to FIG. 1, FIG. 1 is a schematic view of a system of processing network slice based congestion in some embodiments of the present disclosure. As shown in FIG. 1, the system includes a user terminal 11, an Access and Mobility Management Function (AMF) 12, where the user terminal 11 may be a User Equipment (UE), for example, it may be a mobile phone, a tablet personal computer, a laptop computer, a personal digital assistant (PDA), a Mobile Internet Device (MID) or a wearable device and other terminal-side equipment, it should be noted that the specific type of the user terminal 11 is not limited in the embodiment of the present disclosure. The AMF 12 may be a functional entity for access and mobility management in the network side, and may also be called an AMF entity. It should be noted that the specific type of the AMF 12 is not limited in the embodiment of the present disclosure. AMF 12 can be used to perform access and mobility management on multiple network slices, and user terminal 12 can communicate with AMF 12. In addition, the above system may further include a base station 13, where the base station 13 may be a 5G base station (e.g., gNB, 5G NR NB), or may be a 4G base station (e.g., eNB), or may be a 3G base station (e.g., NB), etc. It should be noted that the specific type of the base station 13 is not limited in the embodiment of the present disclosure, and in the embodiment of the present disclosure, the base station 13 may communicate with the user terminal 11 and also the AMF 12. In addition, the above system may further include a functional entity, which may be a session management function (SMF) or a policy control function (PCF), where the SMF may be used for network slicing in the network side. A functional entity that manages sessions. The PCF may be a functional entity that is configured to perform policy control on network slices. Among them, SMF 14 and SMF 15 are taken as examples in the drawings. It should be noted that the specific types of SMF and PCF are not limited in the embodiments of the present disclosure. In addition, the above system may also include a user plane function (UPF), such as UPF 16 and UPF 17 in the drawing, and the above system may further include a data network (DN), e.g., DN 18 and DN 19. It should be noted that FIG. 1 is only illustrated by using two network slices, which is not limited in the embodiment of the present disclosure.

It should be noted that the specific functions of the devices included in the above system will be specifically described through the following embodiments.

Figure 2:
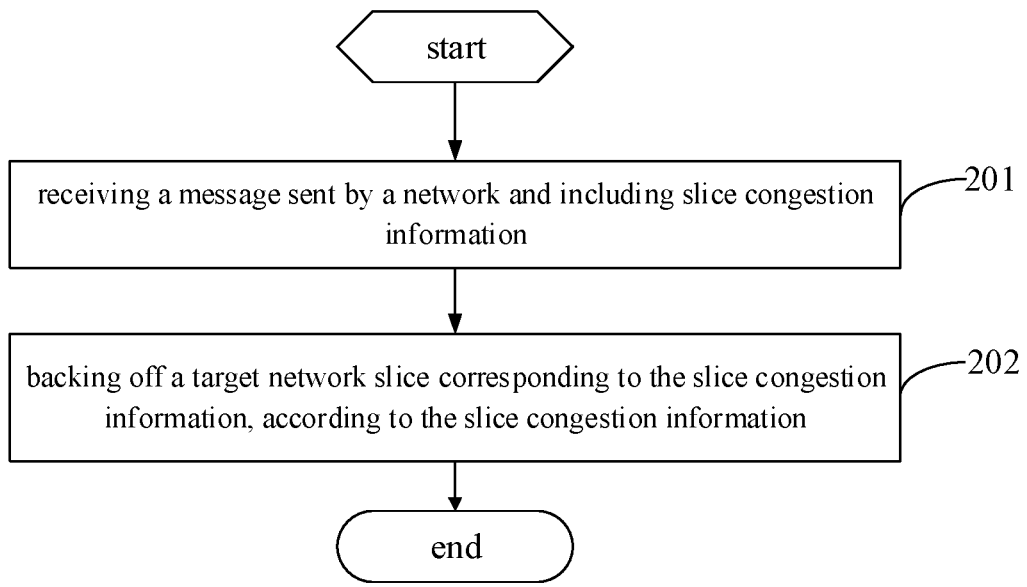
FIG. 2 is a flowchart of a method of processing network slice based congestion in some embodiments of the present disclosure.

Referring to FIG. 2 which is a flowchart of a method of processing network slice based congestion in some embodiments of the present disclosure. The method is performed by a user terminal. As shown in FIG. 2, the method includes the following steps:

Step 201: receiving a message sent by a network including slice congestion information.

The slice congestion information may be used to indicate that the target network slice is congested, and the message may be received from the network side when the target network slice is congested, for example, received from a base station or an AMF. In addition, the target network slice may be one of the network slices accessed by the user terminal. For example, if the user terminal accesses the network slice 1 and the network slice 2 at the same time, the target network slice may be the network slice in a congestion state in the two network slices. In addition, the above-mentioned congestion state may be a congestion state caused by too many services currently to be processed in the network slice.

Step 202: backing off a target network slice corresponding to the slice congestion information, according to the slice congestion information.

The above step of backing off the target network slice corresponding to the slice congestion information according to the slice congestion information may be: starting a backoff timer corresponding to the target network slice or stopping a session management request to the above target slice based on the slice congestion information.

According to the embodiment of the present disclosure, the message sent by the network and including the slice congestion information is received, and a target network slice corresponding to the slice congestion information is backed off according to the slice congestion information, thereby avoid the network slice based congestion from being aggravated and improving the overall performance of the communication system.

Figure 3:
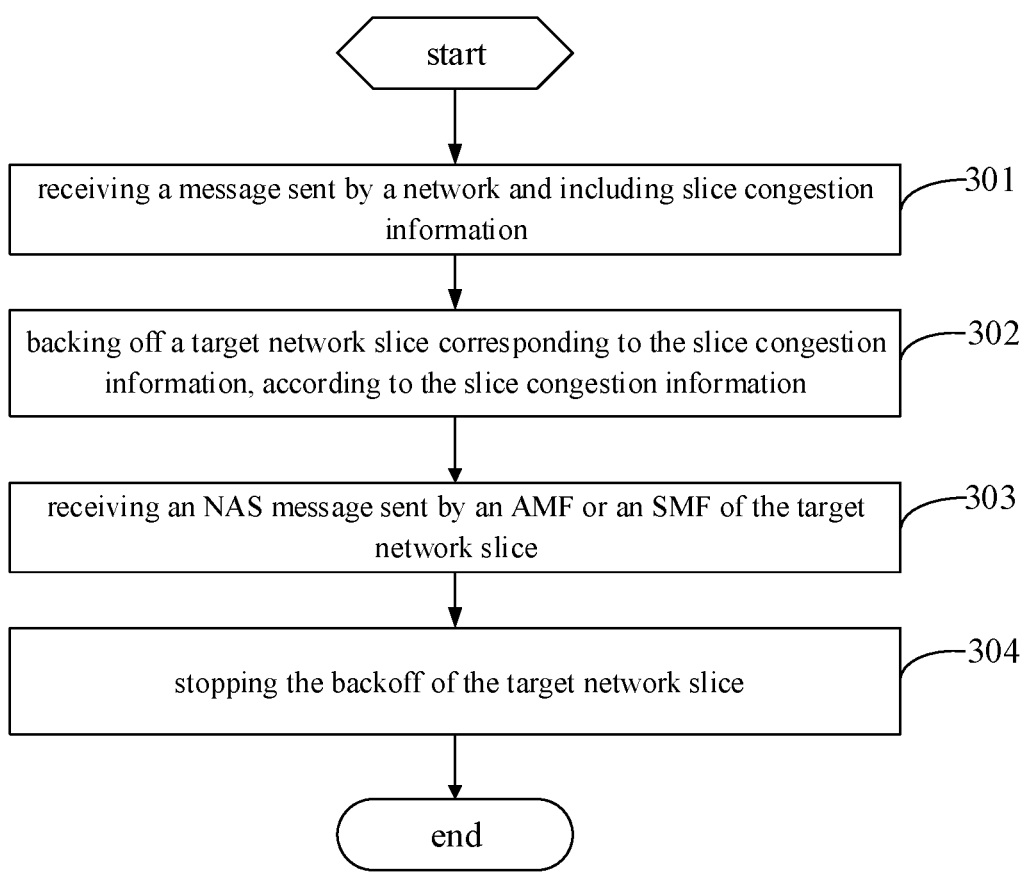
FIG. 3 is a flowchart of another method of processing network slice based congestion in some embodiments of the present disclosure.

Referring to FIG. 3 which is a flowchart of another method of processing network slice based congestion in some embodiments of the present disclosure. The method is performed by a user terminal. As shown in FIG. 3, the method includes the following steps:

Step 301: receiving a message sent by a network including slice congestion information.

The above-mentioned slice congestion information may be used to indicate that the target network slice is congested, and the slice congestion information may further include a backoff parameter which may be a timing parameter of a backoff timer or a deactive value (deactive), etc., which is not limited in the present disclosure.

In addition, the above-mentioned message containing the slice congestion information may be a non-access stratum (NAS) message. Optionally, it can be a session establishment reject message, such as a PDU session establishment reject message, or it can be a session modification reject message, such as a PDU session modification reject message, or it can be a session release command, such as a PDU session release command message, or the above message may also be an access stratum (AS) message, for example, an AS reject message.

Step 302: backing off a target network slice corresponding to the slice congestion information, according to the slice congestion information.

Optionally, the slice congestion information is configured to indicate that the target network slice is congested.

The step of backing off the target network slice corresponding to the slice congestion information according to the slice congestion information includes:
  prohibiting the user terminal from initiating a session management request to the target network slice, according to the slice congestion information.

The slice congestion information being configured to indicate that the target network slice is congested may refer to be that the slice congestion information includes a cause value, a congestion identifier of a slice congestion, or the like.

According to the above embodiment, it is able to prohibit the user terminal from initiating a session management request to the target network slice, thereby avoiding the network slice based congestion from being aggravated.

Optionally, the slice congestion information includes a backoff time;

The step of backing off the target network slice corresponding to the slice congestion information according to the slice congestion information includes:
  starting a backoff timer with a timing time being the backoff time, and prohibiting the user terminal from initiating a session management request to the target network slice until the backoff timer expires or stops.

The prohibiting the user terminal from initiating a session management request to the target network slice may be interpreted as not requesting the service of the target network slice, that is, not requesting the service of the target network slice until a timer expires or stops. In addition, when the backoff timer expires, the user terminal resumes the normal service request for the slice.

In this embodiment, the backoff timer is started, so that it is able to prevent the user terminal from accessing the network slice in a congestion state, without affecting the user terminal's access to other non-congested slices in the network, so that the operator may, according to the real-time congestion status, manage and configure slice resources better in the network where slices are configured.

Optionally, the backing off the target network slice corresponding to the slice congestion information according to the slice congestion information includes:
  in the case that the user terminal is running a backoff timer corresponding to the target network slice and a value of a backoff time in the slice congestion information is not 0 and is not a deactive value, stopping the backoff timer, and starting the backoff timer after a timing time of the backoff timer is set to be the backoff time, and prohibiting the user terminal from initiating a session management request to the target network slice, until the backoff timer expires, until the backoff timer stops, until a Public Land Mobile Network (PLMN) connected to the user terminal changes, or until a Universal Subscriber Identity Module (USIM) of the user terminal is removed;
  or
  in the case that the user terminal is running a backoff timer corresponding to the target network slice and a value of the backoff timer in the slice congestion information is a deactive value, stopping the backoff timer, and prohibiting the user terminal from initiating a session management request to the target network slice, until the user terminal is powered off, until a PLMN connected to the user terminal changes, or until a USIM of the user terminal is removed.

According to the above embodiment, if the user terminal is running a backoff timer corresponding to the target network slice, the backoff timer may be stopped according to a backoff time with a non-zero value in the slice congestion information, and the timing time of the backoff timer is set to the backoff time, and the backoff timer is started, so that the time of the backoff timer is updated, so as to improve the processing capability of the user terminal for the congested network slice. In addition, it is also able to stop the backoff timer in the case that the slice congestion information includes a deactive value, and prohibit the user terminal from initiating a session management request to the target network slice, until the user terminal is powered off, until a PLMN connected to the user terminal changes, or until a USIM of the user terminal is removed, thereby avoid the congestion of the target network slice from being aggravated.

Optionally, subsequent to the receiving the message sent by the network and including the slice congestion information, the method further includes:
  in the case that the user terminal is running the backoff timer corresponding to the target network slice and the slice congestion information includes the backoff time with a value of 0, stopping the backoff timer.

According to the above embodiment, it is able to stop the backoff timer in the case that the slice congestion information includes the backoff time with a value of 0, that is, the backing off of the target network slice is stopped, the user terminal may initiate a session management request to the target network slice, thereby improving a flexibility in handling the network slice based congestion.

Optionally, in the embodiment of the present disclosure, if the user terminal is powered off, the backoff timer continues to run during the user terminal is powered off.

According to the above embodiment, if the user terminal is powered off, the timing time of the backoff timer needs to include the time when the user terminal is powered off, so as to improve the user terminal's ability to handle the network slice based congestion. In addition, in the embodiment of the present disclosure, the backoff timer may be stopped when receiving a downlink signaling sent by the network side, and the downlink signaling may indicate that congestion of the target network slice is stopped.

Optionally, in the embodiment of the present disclosure, the session management request includes a packet data unit session (PDU session) connection establishment request or a packet data unit session connection modification request.

According to the above embodiment, during the validity period of the backoff timer, the user terminal may not initiate a packet data unit session connection establishment request or a packet data unit session connection modification request to the target network slice.

Optionally, prior to the receiving the message sent by the network and including the slice congestion information, the method further includes:

sending a session establishment request to an Authentication Management Function (AMF), where the session establishment request is configured to request establishing a session connection to the target network slice;

the receiving the message sent by the network and including the slice congestion information includes:

receiving a session establishment reject message sent by the AMF, where the session establishment reject message includes indication information indicating that the target network slice is congested and a backoff parameter.

The session establishment request may be a PDU Session Establishment Request, and the request message may be a request to establish a PDU connection to the data network provided by the target network slice. The request message may include a Single Network Slice Selection Assistance Information (S-NSSAI) and a Data Network Name (DNN). The above indication information may be a cause value, a network slice based congestion. In addition, the backoff parameter may include a backoff time or a deactive value in the above embodiment. The specific embodiment may refer to a corresponding description of the foregoing embodiment, which is not repeatedly described here and can achieve the same beneficial effects.

According to the above embodiment, if the target network slice is congested, the user terminal is rejected form initiating a session establishment request to the target network slice.

Optionally, prior to the receiving the message sent by the network and including the slice congestion information, the method further includes:

sending a session modification request to an AMF, where the session modification request is configured to request modifying a session connection of the user terminal in the target network slice;

the receiving the message sent by the network and including the slice congestion information includes:

receiving a session modification reject message sent by the AMF, where the session modification reject message includes indication information indicating that the target network slice is congested and a backoff parameter.

The session modification request may be a PDU Session Modification Request, and the request message may be a request to modify a PDU session to the target network slice. The request message may include an S-NSSAI and a PDU session ID of the target network slice. In addition, the backoff parameter may include a backoff time or a deactive value in the foregoing embodiment. The specific embodiment may refer to a corresponding description of the foregoing embodiment, which is not repeatedly described here and can achieve the same beneficial effects.

According to the above embodiment, if the target network slice is congested, the user terminal is rejected form initiating a session modification request to the target network slice.

Optionally, the receiving the message sent by the network and including the slice congestion information includes:

receiving a session release command sent by an AMF, where the session release command includes indication information indicating that the target network slice is congested and a backoff parameter.

The session release command may be a PDU Session Release Command. Because the user terminal may directly receive the session release command when the target network slice is congested, the efficiency of handling the network slice based congestion may be improved. In addition, the backoff parameter may include a backoff time or a deactive value in the foregoing embodiment. The specific embodiment may refer to a corresponding description of the foregoing embodiment, which is not repeatedly described here and can achieve the same beneficial effects.

Optionally, subsequent to the receiving the session release command sent by the AMF, the method further includes:

releasing a session resource of the target network slice.

Because the session resources of the target network slice are released, the storage space and power consumption of the user terminal are saved.

Optionally, prior to the receiving the message sent by the network and including the slice congestion information, the method further includes:

sending an access stratum (AS) message to a base station, where the AS message includes a Non-access stratum (NAS) message and an access parameter, and the access parameter includes slice information of the target network slice;

the receiving the message sent by the network and including the slice congestion information includes:

receiving an AS reject message sent by the base station, where the AS reject message includes indication information indicating that the target network slice is congested and a backoff time.

The NAS message may include a registration request message or other messages, which is not limited in this embodiment of the present disclosure. In addition, the AS parameters may include slice information, such as S-NSSAI.

According to the above embodiment, if the target network slice is congested, an AS reject message sent by the base station may be received, thereby effectively processing the target network slice based congestion. In addition, the above backoff time may be interpreted as an extended wait time, that is, when the time does not expire, the user terminal is prohibited from initiating a session connection to the target network slice.

Optionally, the backing off the target network slice corresponding to the slice congestion information according to the slice congestion information includes:

starting a backoff timer with a timing time being the backoff time in the AS, where until the backoff timer expires or stops, the user terminal is prohibited from sending a Radio Resource Control (RRC) message including the slice information of the target network slice; or notifying the NAS that the target network slice is congested and the backoff time, and starting a backoff timer with a timing time being the backoff time in the NAS, where until the backoff timer expires or stops, the user terminal is prohibited from sending the NAS message for requesting a service from the target network slice.

According to the above embodiment, it is able to start a corresponding backoff timer at the AS or the NAS through an AS reject message, so as to prevent the congestion of the target network slice from being aggravated.

Optionally, the access parameter includes the slice information of at least two network slices, and the at least two network slices include the target network slice, the AS reject message further includes the slice information of the target network slice.

According to the above embodiment, if the user terminal initiates AS messages of multiple network slices, it is able to return to the user terminal slice information of the target network slice in a congestion state, for example, S-NSSAI.

Optionally, in the embodiment of the present disclosure, the method may further include:

Step 303: receiving an NAS message sent by an AMF or a Session Management Function (SMF) of the target network slice, where the NAS message is configured to indicate that the target network slice is not congested.

The NAS message may be an N1 message, and N1 may represent an interface between a user terminal and an AMF in a 5G network. Optionally, the NAS message is a session message, for example, a PDU session message, such as a PDU session modification command, and the command message may include the S-NSSAI_1 and the PDU session ID of the target network slice.

Step 304: stopping the backoff of the target network slice.

If a timer for the target network slice is started, Step 304 may be stopping the backoff timer.

Optionally, the above network slice may be interpreted as a dedicated core network (décor network) in the LTE system, that is, the above target network slice may be a target dedicated core network. At this time, the AMF described in the embodiment of the present disclosure is implemented by a Mobility Management (MME), and the SMF is implemented by a Serving Gate Way (SGW), and the implementation of the dedicated core network in the LTE system may refer to the implementation of the network slice and can achieve the same beneficial effects. Of course, in the embodiment of the present disclosure, the network slice refers to the network slice in the 5G communication system, and the dedicated core network in the LTE system is only a special case.

According to the above embodiment, through the above steps, when the target network slice is congested, it is able to back off the target network slice. When receive a message from the network side indicating that the target network slice is not congested, and the backing off of the target network slice may be stopped, thereby improving the user terminal's ability to handle the network slice based congestion, and also improving the communication performance of the user terminal.

Figure 4:
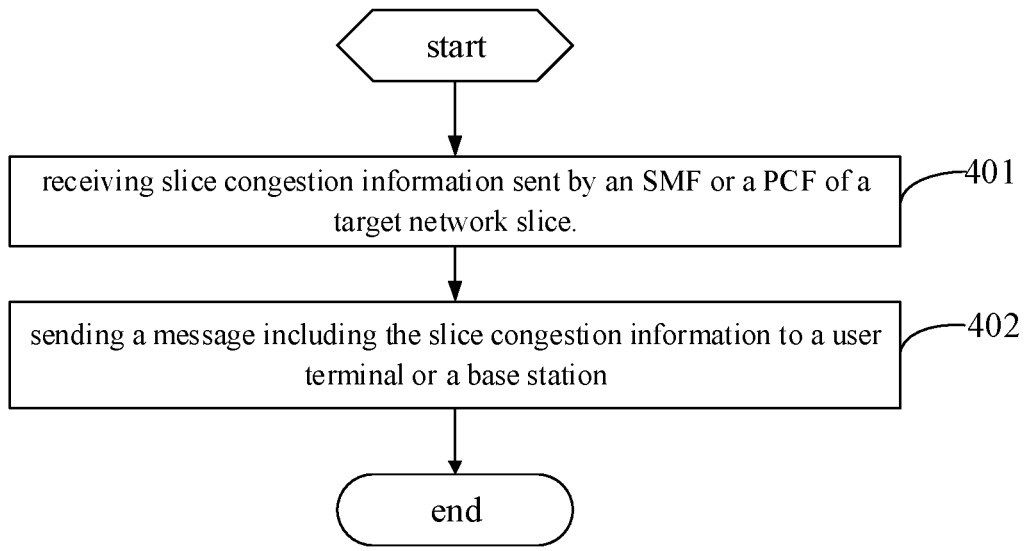
FIG. 4 is a flowchart of another method of processing network slice based congestion in some embodiments of the present disclosure.

Referring to FIG. 4 which is a flowchart of another method of processing network slice based congestion in some embodiments of the present disclosure. The method is performed by AMF, as shown in FIG. 4, the method includes:

Step 401: receiving slice congestion information sent by a Session Management Function (SMF) or a Policy Control Function (PCF) of a target network slice.

The congestion information may refer to the congestion information sent by the SMF to the AMF when the target network slice is congested, so as to indicate that the target network slice is congested.

Step 402: sending a message including the slice congestion information to a user terminal or a base station, where the slice congestion information is configured to enable the user terminal to back off, according to the slice congestion information, a target network slice corresponding to the slice congestion information.

For the slice congestion information, reference may be made to the corresponding descriptions of the embodiments shown in FIG. 2 and FIG. 3, which are not described herein again, and the same beneficial effects can be achieved.

According to the above embodiment, Step 401 and Step 402 may prevent the network slice from becoming more congested, so as to improve the overall performance of the communication system.

Figure 5:
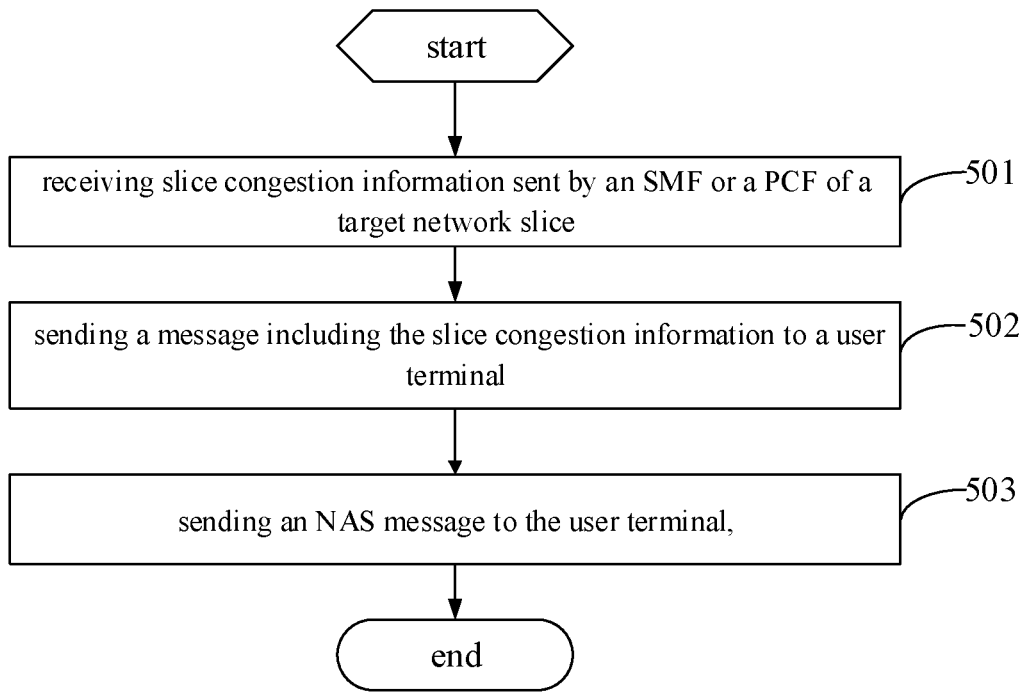
FIG. 5 is a flowchart of another method of processing network slice based congestion in some embodiments of the present disclosure.

Refer to FIG. 5 which is a flowchart of another method of processing network slice based congestion in some embodiments of the present disclosure. The method is performed by AMF, as shown in FIG. 5, the method includes:

Step 501: receiving slice congestion information sent by an SMF or a PCF of a target network slice.

The congestion information may refer to the congestion information sent by the SMF to the AMF when the target network slice is congested, so as to indicate that the target network slice is congested.

Step 502: sending a message including the slice congestion information to a user terminal, where the slice congestion information is configured to enable the user terminal to back off, according to the slice congestion information, a target network slice corresponding to the slice congestion information.

For the above slice congestion information, reference may be made to the corresponding descriptions of the embodiments shown in FIG. 2 and FIG. 3, which are not described herein again, and the same beneficial effects can be achieved. Of course, in this embodiment, in some scenarios, Step 502 may also be sending the above-mentioned message comprising slice congestion information to the base station.

Optionally, the slice congestion information is configured to indicate that the target network slice is congested, and the slice congestion information is configured to enable the user terminal to prohibit, according to the slice congestion information, the user terminal from initiating a session management request to the target network slice.

For the foregoing slice congestion information, reference may be made to the corresponding descriptions of the embodiments shown in FIG. 2 and FIG. 3, which are not described herein again, and the same beneficial effects can be achieved.

Optionally, the slice congestion information includes a backoff time, and the backoff time is configured to enable the user terminal to start a backoff timer with a timing time being the backoff time, and prohibit the user terminal from initiating a session management request to the target network slice until the backoff timer expires or stops.

For the foregoing backoff period, reference may be made to the corresponding descriptions of the embodiments shown in FIG. 2 and FIG. 3, which are not described herein again, and the same beneficial effects can be achieved.

Optionally, in the case that a value of a backoff time in the slice congestion information is not 0 and is not a deactive value and then the user terminal is running a backoff timer corresponding to the target network slice, stopping the backoff timer, and starting the backoff timer after a timing time of the backoff timer is set to be the backoff time, and prohibiting the user terminal from initiating a session management request to the target network slice, until the backoff timer expires, until the backoff timer stops, until a Public Land Mobile Network (PLMN) connected to the user terminal changes, or until a Universal Subscriber Identity Module (USIM) of the user terminal is removed;

or, in the case that a value of the backoff timer in the slice congestion information is a deactive value and then the user terminal is running a backoff timer corresponding to the target network slice, stopping the backoff timer, and prohibiting the user terminal from initiating a session management request to the target network slice, until the user terminal is powered off, until a PLMN connected to the user terminal changes, or until a USIM of the user terminal is removed;

or, in the case that the slice congestion information includes the backoff time with a value of 0 and then the user terminal is running the backoff timer corresponding to the target network slice, stopping the backoff timer.

For the foregoing slice congestion information, reference may be made to the corresponding description of the embodiment shown in FIG. 3, which is not described herein again, and the same beneficial effects can be achieved.

Optionally, subsequent to the receiving the slice congestion information sent by the SMF or the PCF of the target network slice and prior to the sending the message including the slice congestion information to the user terminal, the method further includes:

receiving a session establishment request sent by the user terminal, where the session establishment request is configured to request establishing a session connection to the target network slice;

the sending the message including the slice congestion information to the user terminal includes:

sending a session establishment reject message to the user terminal, where the session establishment reject message includes indication information indicating that the target network slice is congested and a backoff parameter.

For the foregoing session establishment request and session establishment reject message, reference may be made to the corresponding description of the embodiment shown in FIG. 3, which is not described herein again, and the same beneficial effects can be achieved.

Optionally, subsequent to the receiving the slice congestion information sent by the SMF or the PCF of the target network slice and prior to the sending the message including the slice congestion information to the user terminal, the method further includes:

receiving a session modification request sent by the user terminal, where the session modification request is configured to request modifying a session connection of the user terminal in the target network slice;

the sending the message including the slice congestion information to the user terminal includes:

sending a session modification reject message to the user terminal, where the session modification reject message includes indication information indicating that the target network slice is congested and a backoff parameter.

For the foregoing session modification request and sending the session modification reject message, reference may be made to the corresponding descriptions of the embodiments shown in FIG. 2 and FIG. 3, which are not described herein again, and the same beneficial effects can be achieved.

Optionally, the sending the message including the slice congestion information to the user terminal includes:

sending a session release command to the user terminal, where the session release command includes indication information indicating that the target network slice is congested and a backoff parameter.

For the foregoing session release command, reference may be made to the corresponding description of the embodiment shown in FIG. 3, which is not described herein again, and the same beneficial effects can be achieved.

Optionally, the method further includes:

Step 503: sending a Non-access stratum (NAS) message to the user terminal, where the NAS message is configured to indicate that the target network slice is not congested.

For the foregoing NAS message, reference may be made to the corresponding description of the embodiment shown in FIG. 3, which is not described herein again, and the same beneficial effects can be achieved.

Optionally, the sending the message including the slice congestion information to the base station includes:

sending a congestion start message to the base station, where the congestion start message is configured to indicate that the target network slice is congested, and the congestion start message includes a backoff parameter.

The above-mentioned congestion start message may be an N2 message. The message may include the S-NSSAI of the target network slice and the backoff time, to inform the base station that the target network slice is congested, and RRC's congestion control mechanism needs to be started to reject the RRC signaling requesting the target network slice service.

Optionally, subsequent to the sending the congestion start message to the base station, the method further includes:

sending a congestion stop message to the base station, where the congestion stop message is configured to indicate that the target network slice is not congested.

According to the above embodiment, it is able to promptly notify the user terminal or the base station to stop the corresponding backoff operation, so as to improve the ability of the user terminal and the base station to handle the network slice based congestion.

Figure 6:
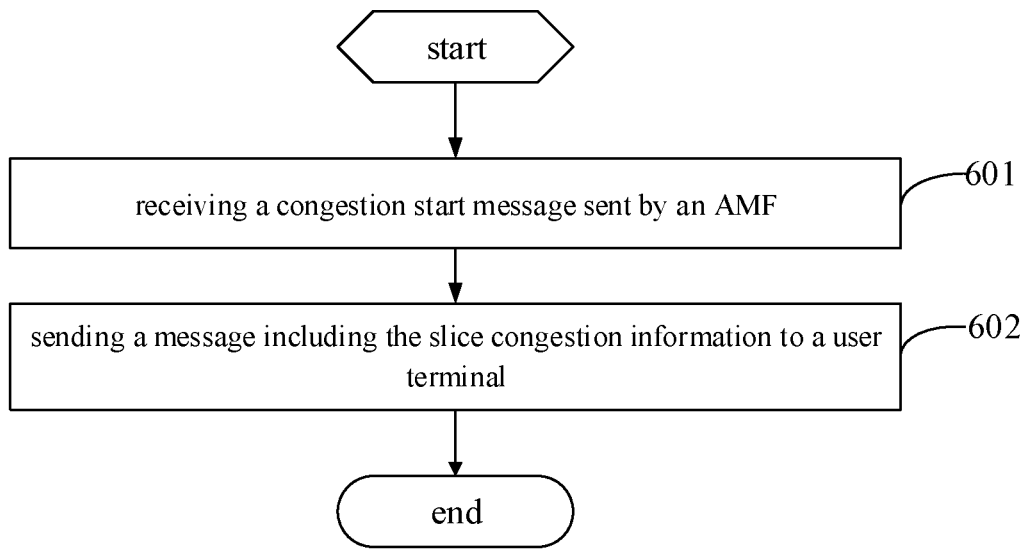
FIG. 6 is a flowchart of another method of processing network slice based congestion in some embodiments of the present disclosure.

Referring to FIG. 6 which is a flowchart of another method of processing the network slice based congestion in some embodiments of the present disclosure. The method is performed by a base station, as shown in FIG. 6, and the method includes:

Step 601: receiving a congestion start message sent by an AMF.

For the foregoing congestion start message, reference may be made to corresponding descriptions in the embodiments shown in FIG. 2 to FIG. 5, which are not described herein again, and the same beneficial effects can be achieved.

Step 602: sending a message including the slice congestion information to a user terminal, where the slice congestion information is configured to enable the user terminal to back off, according to the slice congestion information, a target network slice corresponding to the slice congestion information.

For the above slice congestion information, reference may be made to corresponding descriptions in the embodiments shown in FIG. 2 to FIG. 5, which are not described herein again, and the same beneficial effects can be achieved.

According to the above embodiment, it is able to prevent the network slice from becoming more congested, so as to improve the overall performance of the communication system.

Figure 7:
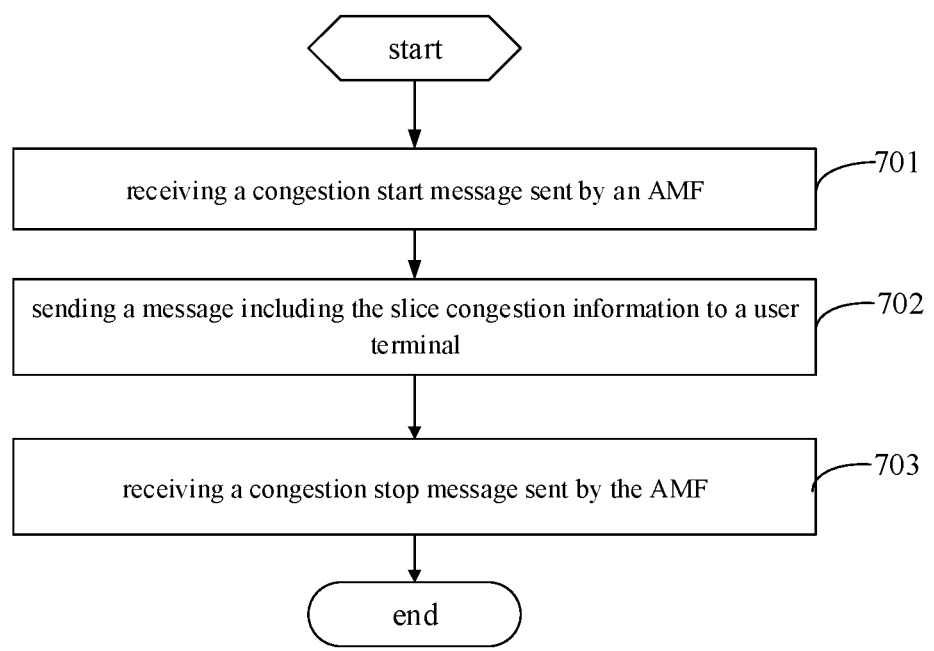
FIG. 7 is a flowchart of another method of processing network slice based congestion in some embodiments of the present disclosure.

Referring to FIG. 7 which is a flowchart of another method of processing network slice based congestion in some embodiments of the present disclosure. The method is performed by a base station. As shown in FIG. 7, the method includes:

Step 701: receiving a congestion start message sent by an AMF.

For the foregoing congestion start message, reference may be made to corresponding descriptions in the embodiments shown in FIG. 2 to FIG. 5, which are not described herein again, and the same beneficial effects can be achieved.

Step 702: sending a message including the slice congestion information to a user terminal, where the slice congestion information is configured to enable the user terminal to back off, according to the slice congestion information, a target network slice corresponding to the slice congestion information.

For the above slice congestion information, reference may be made to corresponding descriptions in the embodiments shown in FIG. 2 to FIG. 5, which are not described herein again, and the same beneficial effects can be achieved.

Optionally, the congestion start message is configured to indicate that the target network slice is congested, the slice congestion information is configured to indicate that the target network slice is congested, and the slice congestion information is configured to enable the user terminal to prohibit, according to the slice congestion information, the user terminal from initiating a session management request to the target network slice.

For the above congestion start message and slice congestion information, reference may be made to corresponding descriptions in the embodiments shown in FIG. 2 to FIG. 5, which are not described herein again, and the same beneficial effects can be achieved.

Optionally, subsequent to the receiving the congestion start message sent by the AMF, the method further includes:
rejecting a Radio Resource Control (RRC) signaling including slice information of the target network slice.

The rejection may be rejecting receiving or processing the RRC signaling including slice information of the target network slice.

Optionally, subsequent to the receiving the congestion start message sent by the AMF and prior to the sending the message including the slice congestion information to the user terminal, the method further includes:
receiving an access stratum (AS) message sent by the user terminal, where the AS message includes an NAS message and an access parameter, and the access parameter includes slice information of the target network slice;
the sending the message including the slice congestion information to the user terminal includes:
sending an AS reject message to the user terminal, where the AS reject message includes indication information indicating that the target network slice is congested and a backoff time.

For the foregoing AS message and AS reject message, reference may be made to the corresponding description in the embodiment shown in FIG. 3, which is not described herein again, and the same beneficial effects can be achieved.

Optionally, the NAS message includes a registration request message.

Optionally, the access parameter includes the slice information of at least two network slices, the at least two network slices include the target network slice, and;
the AS reject message further includes the slice information of the target network slice.

For the foregoing access parameters and AS reject messages, reference may be made to the corresponding descriptions in the embodiment shown in FIG. 3, which are not repeated here, and the same beneficial effects can be achieved.

Optionally, subsequent to the sending the message including the slice congestion information to the user terminal, the method further includes:

Step 703: receiving a congestion stop message sent by the AMF, where the congestion stop message is configured to indicate that the target network slice is not congested.

According to the above embodiment, it is able to stop the corresponding backoff operation in time to improve the base station's ability to handle the network slice based congestion.

Figure 8:
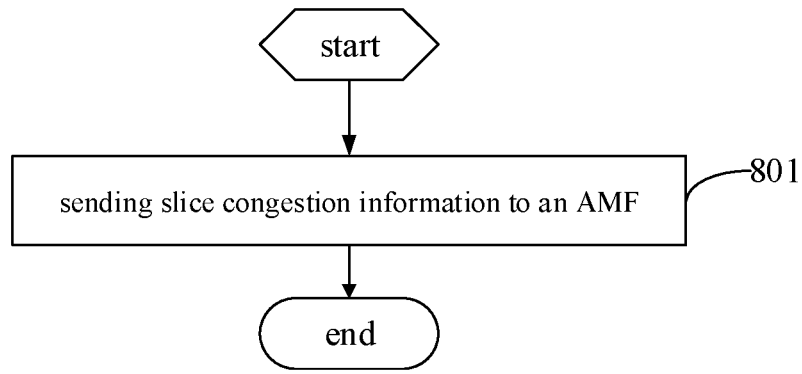
FIG. 8 is a flowchart of another method of processing network slice based congestion in some embodiments of the present disclosure.

Referring to FIG. 8 which is another method of processing network slice based congestion in some embodiments of the present disclosure. The method includes:

Step 801: sending slice congestion information to an AMF, where the slice congestion information is configured to enable the AMF to send a message including the slice congestion information to a user terminal or a base station, where the slice congestion information is configured to enable the user terminal to back off, according to the slice congestion information, a target network slice corresponding to the slice congestion information.

For the above slice congestion information, reference may be made to corresponding descriptions in the embodiments shown in FIG. 2 to FIG. 5, which are not described herein again, and the same beneficial effects can be achieved.

Optionally, the slice congestion information is configured to indicate that the target network slice is congested.

For the above slice congestion information, reference may be made to corresponding descriptions in the embodiments shown in FIG. 2 to FIG. 5, which are not described herein again, and the same beneficial effects can be achieved.

Optionally, subsequent to the sending slice congestion information to the AMF, the method further includes:
sending a congestion stop message to the AMF, where the congestion stop message is configured to indicate that the target network slice is not congested.

For the foregoing congestion stop message, reference may be made to corresponding descriptions in the embodiments shown in FIG. 2 to FIG. 5, which are not described herein again, and the same beneficial effects can be achieved.

Optionally, subsequent to the sending slice congestion information to the AMF, the method further includes:
sending a Non-access stratum (NAS) message to the user terminal, where the NAS message is configured to indicate that the target network slice is not congested, to enable the user terminal to stop a backoff timer corresponding to the target network slice.

For the foregoing congestion stop message, reference may be made to corresponding descriptions in the embodiments shown in FIG. 2 to FIG. 5, which are not described herein again, and the same beneficial effects can be achieved.

According to the above embodiment, it is able to enable the user terminal to backoff the congested network slice, so as to prevent the network slice from being more congested.

Figure 9:
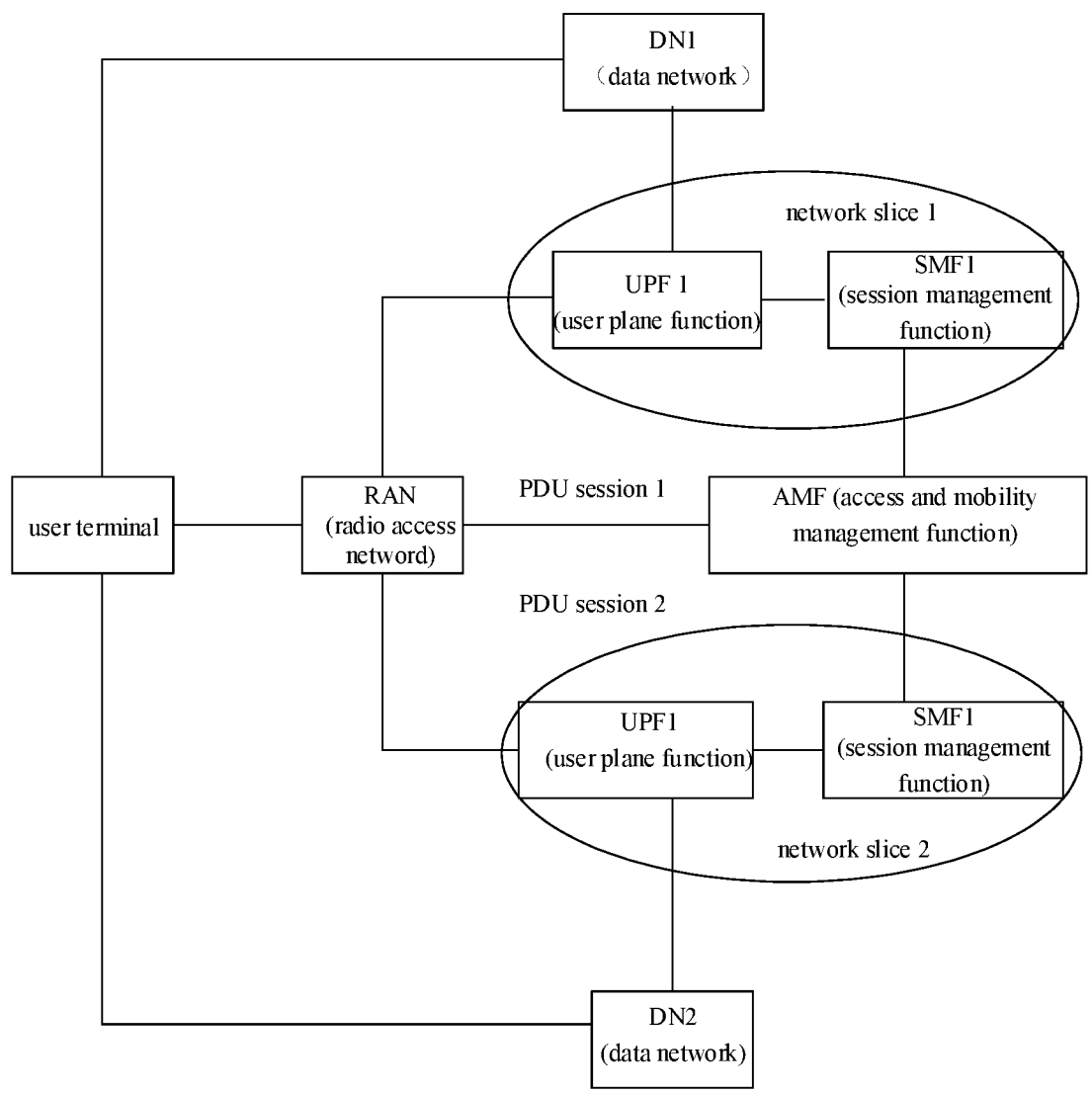
FIG. 9 is a schematic view of a scenario for processing network slice based congestion in some embodiments of the present disclosure.

The method of processing the network slice based congestion in some embodiments of the present disclosure is described below with reference to the congestion scenario shown in FIG. 9. As shown in FIG. 9, a user terminal is connected to the data network DN1 through UPF1 in network slice 1, and the control node of the user plane is SMF1, which is corresponding to PDU session 1, and the S-NSSAI corresponding to network slice 1 is S-NSSAI_1. In addition, the user terminal may further request establishing another PDU session 3, which can be connected to the external network DN3 through the S-NSSAI_1. Different data networks connected to a network slice may be distinguished by different DDNs. At the same time, the user terminal is connected to the data network DN2 through the UPF2 in network slice 2. The control node of the user plane is SMF2, and the S-NSSAI corresponding to PDU session2 and slice2 is S-NSSAI_2. UPF1 and UPF2 in FIG. 9 are user plane functions in network slice 1 and network slice 2 respectively.

Figure 10:
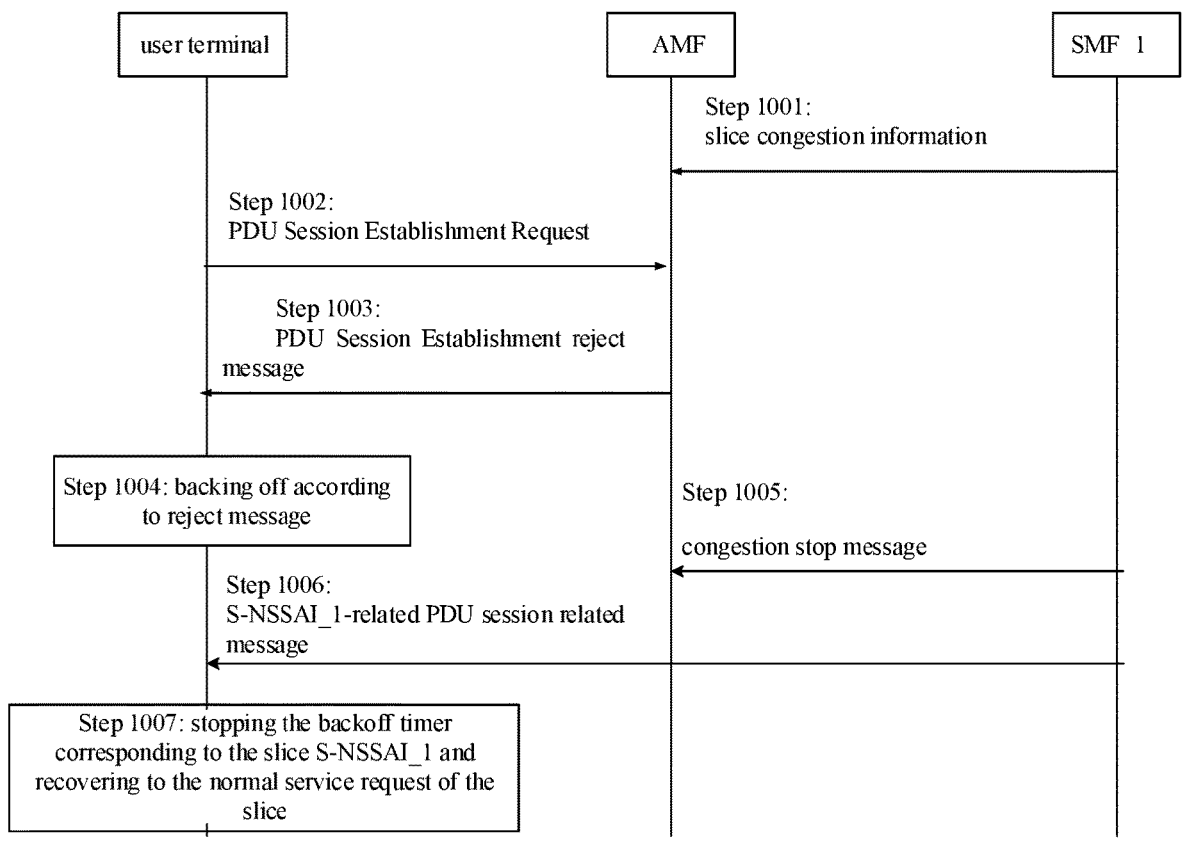
FIG. 10 is a flowchart of a method of processing network slice based congestion in some embodiments of the present disclosure.

Example 1, as shown in FIG. 10, the method includes the following steps:

Step 1001: in the case that the network slice 1 is congested, SMF1 sends slice congestion information to the AMF to notify the AMF that the current network slice 1 is congested, and triggers the AMF to start the following congestion control mechanism.

Step 1002: the user terminal sends a PDU Session Establishment Request to request the network to establish a PDU connection to the data network DDN3 provided by the slice S-NSSAI_1, the request includes S-NSSAI_1 and DDN3.

Step 1003: the AMF determines that the slice S-NSSAI_1 is congested. The AMF sends a PDU Session Establishment reject message to the user terminal. The message carries a cause value: slice congestion and the value of the backoff timer corresponding to the network slice.

Step 1004: the user terminal performs a corresponding backoff operation according to the reject message.

If a slice backoff timer corresponding to S-NSSAI_1 is running, the user terminal first stops the timer and performs the following actions:

If the value of the backoff timer provided by the AMF is not 0 or is not deactive, the user terminal sets the value of the slice backoff timer to the value of the backoff timer provided by the AMF; until the timer expires, the PLMN changes or the USIM is removed, the user terminal cannot initiate a session management request (SM request) to the same network slice. The request may include a PDU session establishment message, a PDU session modification message and the like.

If the value of the backoff timer provided by the AMF is deactive, the user terminal cannot initiate the SM request to the same network slice until the user terminal is powered off, the PLMN changes, or the USIM is removed, where the request includes the PDU session establishment and PDU session modification.

If the value of the backoff timer provided by the AMF is 0, the user terminal can initiate the SM request to the same network slice, the request incudes the PDU session establishment message and the PDU session modification message.

Step 1005: in the case that the network slice 1 is not congested, the SMF1 sends a congestion stop message to the AMF to notify the AMF that the current network slice 1 is not congested.

Step 1006: SMF1 sends S-NSSAI_1-related PDU session related message to the user terminal, such as a PDU session modification command which includes S-NSSAI_1 and PDU session ID1.

Step 1007: the user terminal stops the backoff timer corresponding to the slice S-NSSAI_1, and recovers to the normal service request of the slice.

Figure 11:
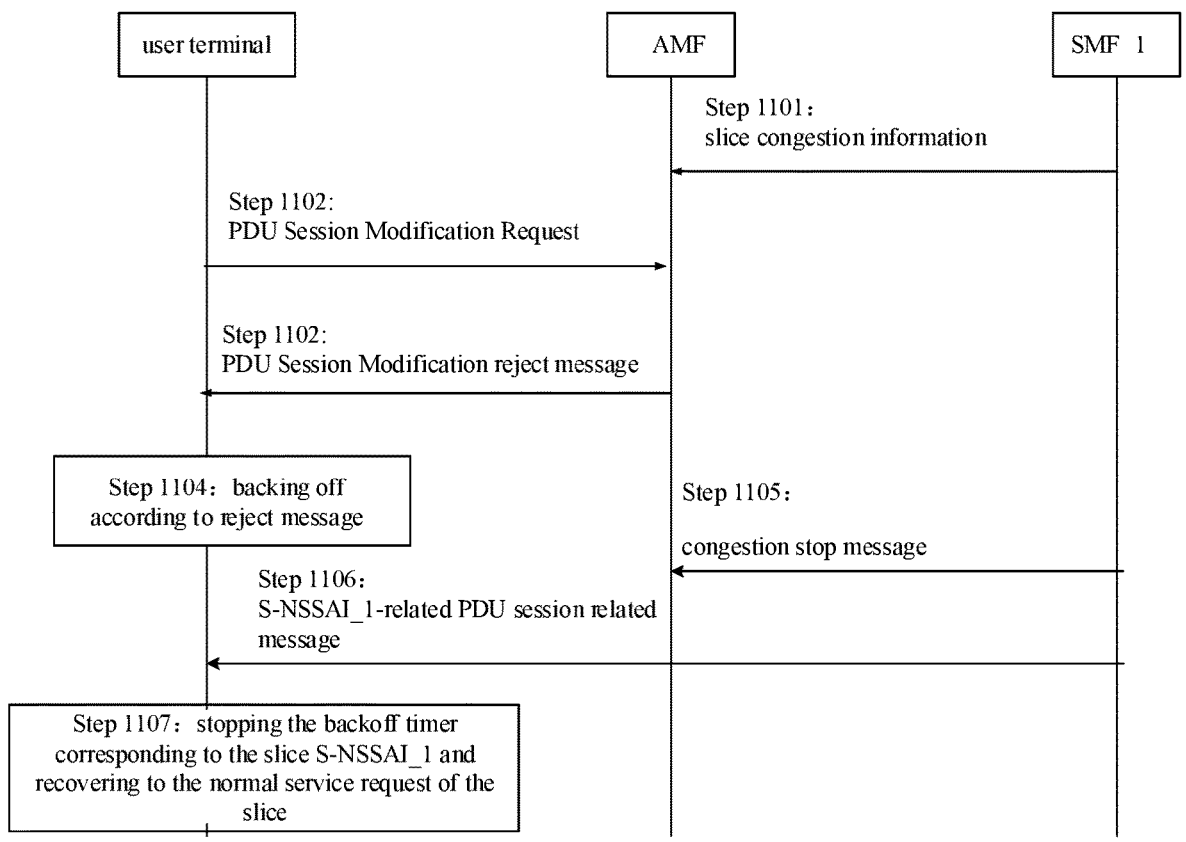
FIG. 11 is a flowchart of another method of processing network slice based congestion in some embodiments of the present disclosure.

Example 2, as shown in FIG. 11, the method includes the following steps:

Step 1101: in the case that network slice 1 is congested, SMF1 sends slice congestion information to the AMF to notify the AMF that the current network slice 1 is congested, and triggers the AMF to start the following congestion control mechanism.

Step 1102: the user terminal sends a PDU Session Modification Request (including S-NSSAI_1, PDU session ID1) message to the network to request modification to PDU session 1 of slice S-NSSAI_1.

Step 1103: the AMF determines that the slice S-NSSAI_1 is congested, and the AMF sends a PDU Session modification reject message to the user terminal. The message carries a cause value: slice congestion and the value of the backoff timer corresponding to the network slice.

Step 1104: the user terminal performs a corresponding backoff operation according to the reject message.

If a slice backoff timer corresponding to S-NSSAI_1 is running, the user terminal first stops the timer and performs the following actions:

If the value of the backoff timer provided by the AMF is not 0 or is not deactive, the user terminal sets the value of the slice backoff timer to the value of the backoff timer provided by the AMF; until the timer expires, the PLMN changes or the USIM is removed, the user terminal cannot initiate a session management request (SM request) to the same network slice. The request may include the PDU session establishment message, the PDU session modification message and the like.

If the value of the backoff timer provided by the AMF is deactive, the user terminal cannot initiate the SM request to the same network slice until the user terminal is powered off, the PLMN is changed, or the USIM is removed, the request includes the PDU session establishment message, the PDU session modification message and the like.

If the value of the backoff timer provided by the AMF is 0, the user terminal can initiate the SM request to the same network slice, the request includes the PDU session establishment message, the PDU session modification message and the like.

Step 1105: in the case that the network slice 1 is not congested, the SMF1 sends a congestion stop message to the AMF to notify the AMF that the current network slice 1 is not congested.

Step 1106: SMF1 sends S-NSSAI_1 related PDU session related messages to the UE, such as PDU session modification command (S-NSSAI_1, PDU session ID 1).

Step 1107: the UE stops the backoff timer corresponding to the slice S-NSSAI_1, and recovers to the normal service request of the slice.

Figure 12:
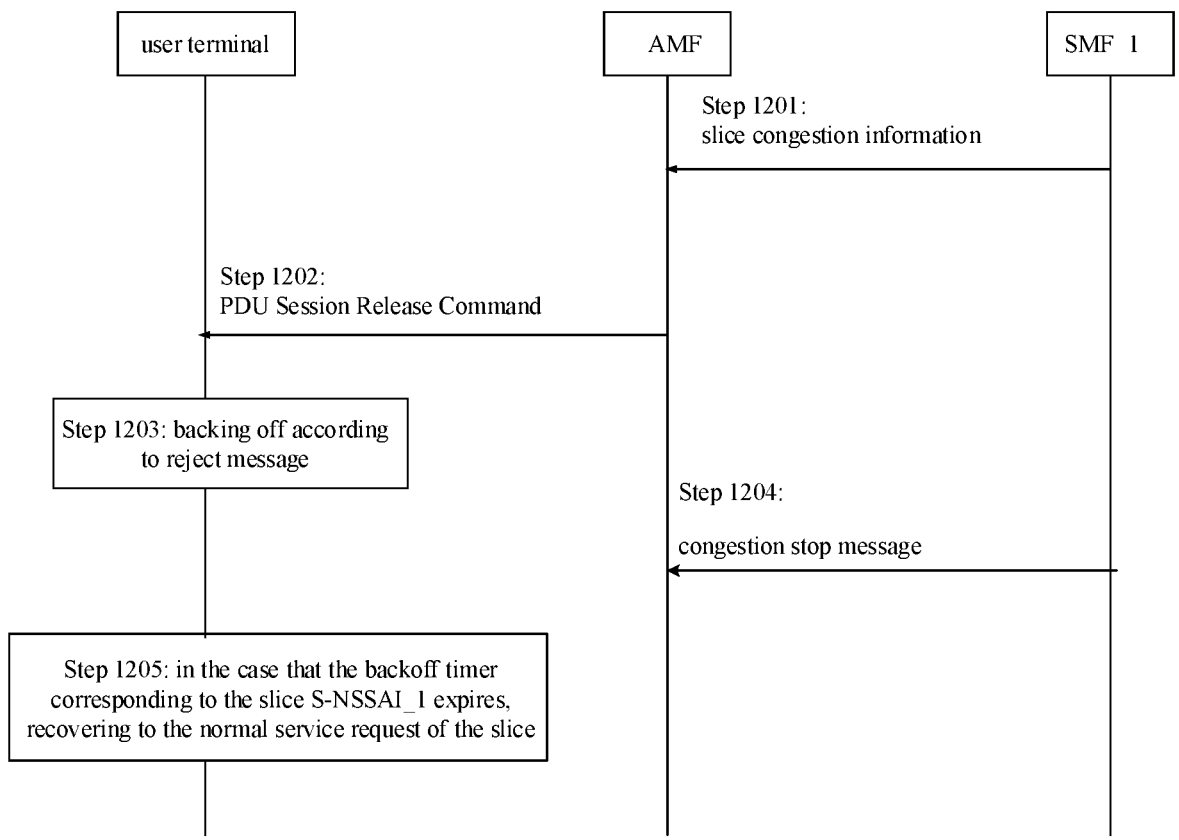
FIG. 12 is a flowchart of another method of processing network slice based congestion in some embodiments of the present disclosure.

Example 3, as shown in FIG. 12, the method includes the following steps:

Step 1201: in the case that slice1 is congested, SMF1 sends slice congestion information to the AMF to notify the AMF that the current slice1 is congested, and triggers the AMF to start the following congestion control mechanism.

Step 1202: the AMF sends a PDU Session release command message to the UE. The message carries a cause value: slice congestion and a backoff timer value corresponding to the network slice.

Step 1203: the user terminal performs a corresponding backoff operation according to the reject message.

If a slice backoff timer corresponding to S-NSSAI_1 is running, the user terminal first stops the timer and performs the following actions:

If the value of the backoff timer provided by the AMF is not 0 or is not deactive, the user terminal sets the value of the slice backoff timer to the value of the backoff timer provided by the AMF; until the timer expires, the PLMN changes or the USIM is removed, the user terminal cannot initiate a session management request (SM request) to the same network slice, where the request includes the PDU session establishment message and the PDU session modification message.

If the value of the backoff timer provided by the AMF is deactive, the user terminal cannot initiate the SM request to the same network slice until the user terminal is powered off, the PLMN is changed, or the USIM is removed, where the request includes the PDU session establishment message and the PDU session modification message.

If the value of the backoff timer provided by the AMF is 0, the user terminal can initiate the SM request to the same network slice, where the request includes the PDU session establishment message and the PDU session modification message.

Step 1204: in the case that the network slice 1 is not congested, the SMF1 sends a congestion stop message to the AMF to notify the AMF that the current network slice 1 is not congested.

Step 1205: after the backoff timer corresponding to the slice S-NSSAI_1 expires, the user terminal recovers to the normal service request for the slice.

Figure 13:
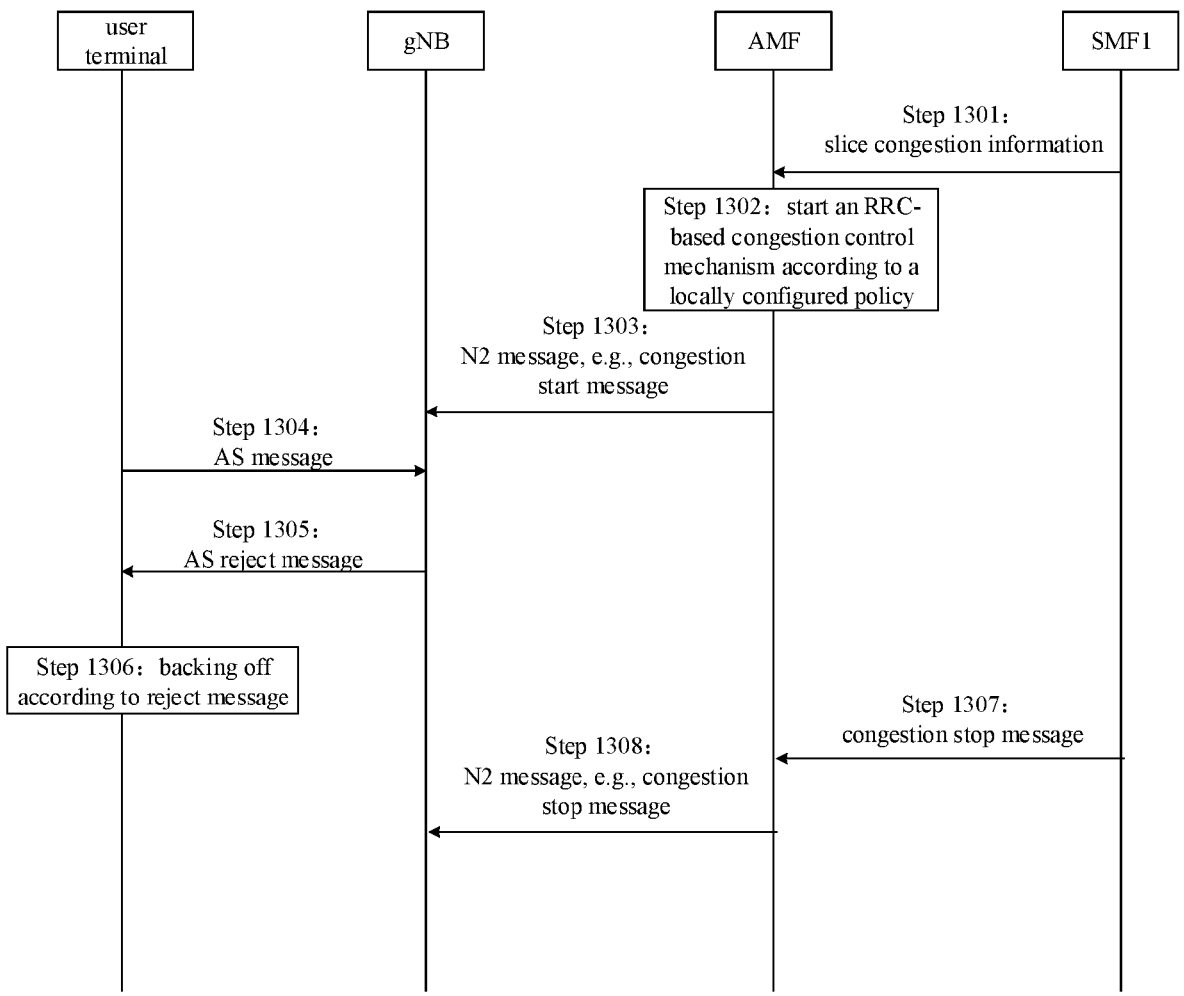
FIG. 13 is a flowchart of another method of processing network slice based congestion in some embodiments of the present disclosure.

Example 4, as shown in FIG. 13, the method includes the following steps:

Step 1301: in the case that the network slice 1 is congested, SMF1 sends the slice congestion information to the AMF to notify the AMF that the current network slice 1 is congested, and triggers the AMF to start the following congestion control mechanism.

Step 1302: the AMF decides to start an RRC-based congestion control mechanism according to a locally configured policy.

Step 1303: the AMF sends an N2 message, for example, a congestion start message (including S-NSSAI, backoff time), to inform the gNB that the current slice S-NSSAI is congested, and an RRC-based congestion control mechanism needs to be started.

Step 1304: the user terminal sends an AS message to the gNB, the AS message includes a NAS message and AS parameters. The NAS message may be a registration request message. The AS parameter includes slice information, such as S-NSSAI.

Step 1305: the gNB determines that the current slice S-NSSAI is congested, and needs to reject the AS message of the user terminal. The gNB sends an AS reject message to the UE. The AS reject message includes a cause value of Slice congestion and a backoff time. When there is multiple slice information, the AS reject message may also include the information of the congested slice.

Step 1306: the user terminal performs a corresponding backoff operation according to the reject message.

After receiving the AS reject message, the backoff timer can be started and the RRC message including the congestion slice information is no longer sent; or The AS notifies the NAS of the current slice S-NSSAI congestion and the corresponding backoff time, the NAS starts the backoff timer associated with the congested slice, and no longer sends the NAS message for requesting services from the congested slice.

Step 1307: in the case that the network slice 1 is not congested, the SMF1 sends a congestion stop message to the AMF to notify the AMF that the current network slice 1 is not congested.

Step 1308: the AMF sends an N2 message, for example, a congestion stop message (including S-NSSAI) to the gNB, and the backoff timer corresponding to the slice S-NSSAI_1 expires, and the user terminal recovers to the normal service request of the slice.

Figure 14:
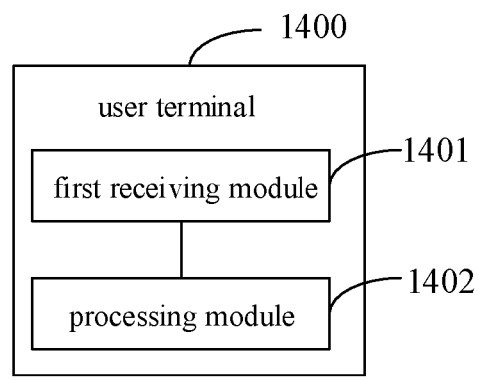
FIG. 14 is a schematic view of a user terminal in some embodiments of the present disclosure.

Referring to FIG. 14 which is a schematic view of a user terminal in some embodiments of the present disclosure. As shown in FIG. 14, the user terminal 1400 includes:

a first receiving module 1401, configured to receive a message sent by a network including slice congestion information; and a processing module 1402, configured to back off a target network slice corresponding to the slice congestion information, according to the slice congestion information Optionally, the slice congestion information is configured to indicate that the target network slice is congested;

the processing module 1402 is further configured to prohibit the user terminal from initiating a session management request to the target network slice, according to the slice congestion information.

Optionally, the slice congestion information includes a backoff time;

the processing module 1402 is further configured to start a backoff timer with a timing time being the backoff time, and prohibit the user terminal from initiating a session management request to the target network slice until the backoff timer expires or stops.

Optionally, the processing module 1402 is further configured to: in the case that the user terminal is running a backoff timer corresponding to the target network slice and a value of a backoff time in the slice congestion information is not 0 and is not a deactive value, stop the backoff timer, and start the backoff timer after a timing time of the backoff timer is set to be the backoff time, and prohibit the user terminal from initiating a session management request to the target network slice, until the backoff timer expires, until the backoff timer stops, until a Public Land Mobile Network (PLMN) connected to the user terminal changes, or until a Universal Subscriber Identity Module (USIM) of the user terminal is removed;

or the processing module 1402 is further configured to: in the case that the user terminal is running a backoff timer corresponding to the target network slice and a value of the backoff timer in the slice congestion information is a deactive value, stop the backoff timer, and prohibit the user terminal from initiating a session management request to the target network slice, until the user terminal is powered off, until a PLMN connected to the user terminal changes, or until a USIM of the user terminal is removed.

Figure 15:
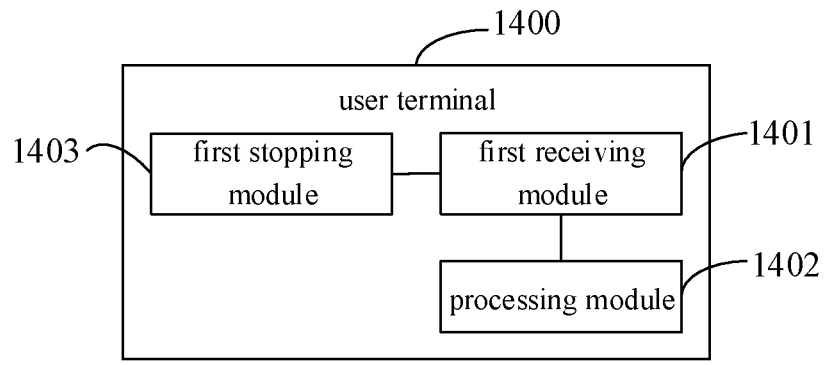
FIG. 15 is a schematic view of another user terminal in some embodiments of the present disclosure.

Optionally, as shown in FIG. 15, the user terminal 1400 further includes:

a first stopping module 1403, configured to, in the case that the user terminal is running the backoff timer corresponding to the target network slice and the slice congestion information includes the backoff time with a value of 0, stop the backoff timer.

Optionally, in the case that the user terminal is powered off, the backoff timer continues to run during the user terminal is powered off.

Optionally, the session management request includes a packet data unit session connection establishment request or a packet data unit session connection modification request.

Figure 16:
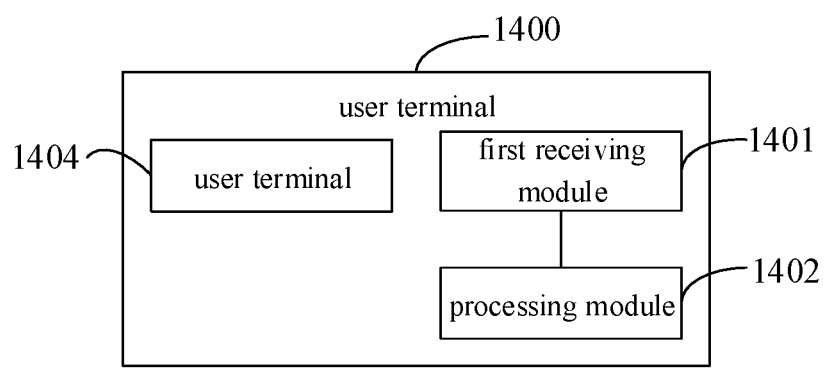
FIG. 16 is a schematic view of another user terminal in some embodiments of the present disclosure.

Optionally, as shown in FIG. 16, the user terminal 1400 further includes:

a first requesting module 1404, configured to send a session establishment request to an Authentication Management Function (AMF), where the session establishment request is configured to request establishing a session connection to the target network slice;

the first receiving module 1401 is further configured to receive a session establishment reject message sent by the AMF, where the session establishment reject message includes indication information indicating that the target network slice is congested and a backoff parameter.

Figure 17:
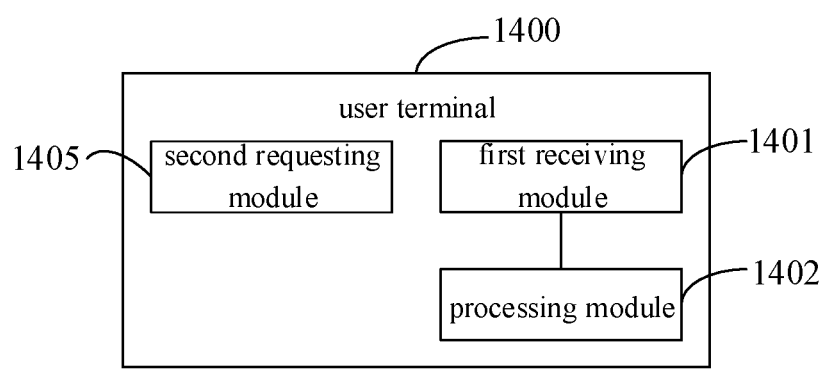
FIG. 17 is a schematic view of another user terminal in some embodiments of the present disclosure.

Optionally, as shown in FIG. 17, the user terminal 1400 further includes:

a second requesting module 1405, configured to send a session modification request to an AMF, where the session modification request is configured to request modifying a session connection of the user terminal in the target network slice;

the first receiving module 1401 is further configured to receive a session modification reject message sent by the AMF, where the session modification reject message includes indication information indicating that the target network slice is congested and a backoff parameter.

Optionally, the first receiving module 1401 is further configured to receive a session release command sent by an AMF, where the session release command includes indication information indicating that the target network slice is congested and a backoff parameter.

Figure 18:
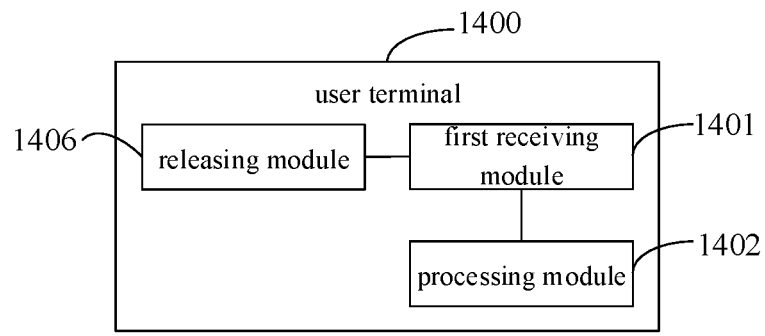
FIG. 18 is a schematic view of another user terminal in some embodiments of the present disclosure.

Optionally, as shown in FIG. 18, the user terminal 1400 further includes:

a releasing module 1406, configured to release a session resource of the target network slice.

Figure 19:
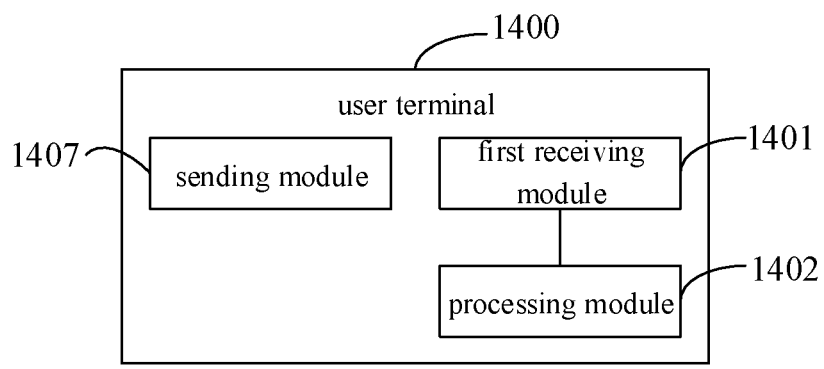
FIG. 19 is a schematic view of another user terminal in some embodiments of the present disclosure.

Optionally, as shown in FIG. 19, the user terminal 1400 further includes:

a sending module 1407, configured to send an access stratum (AS) message to a base station, where the AS message includes a Non-access stratum (NAS) message and access stratum parameters, and the access stratum parameters include slice information of the target network slice;

the first receiving module 1401 is further configured to receive an AS reject message sent by the base station, where the AS reject message includes indication information indicating that the target network slice is congested and a backoff time.

Optionally, the processing module 1402 is further configured to start a backoff timer with a timing time being the backoff time in the AS, where until the backoff timer expires or stops, the user terminal is prohibited from sending a Radio Resource Control (RRC) message including the slice information of the target network slice; or the processing module 1402 is further configured to notify the NAS that the target network slice is congested and the backoff time, and start a backoff timer with a timing time being the backoff time in the NAS, where until the backoff timer expires or stops, the user terminal is prohibited from sending the NAS message for requesting a service from the target network slice.

Optionally, the NAS message includes a registration request message.

Optionally, the access parameter includes the slice information of at least two network slices, and the at least two network slices include the target network slice, the AS reject message further includes the slice information of the target network slice.

Figure 20:
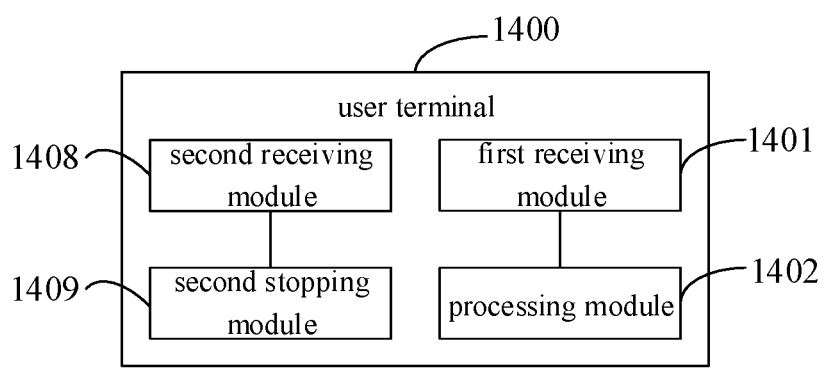
FIG. 20 is a schematic view of another user terminal in some embodiments of the present disclosure.

Optionally, as shown in FIG. 20, the user terminal 1400 further includes:

a second receiving module 1408, configured to receive an NAS message sent by an AMF or a Session Management Function (SMF) of the target network slice, where the NAS message is configured to indicate that the target network slice is not congested; and a second stopping module 1409, configured to stop the backoff timer.

Optionally, the target network slice is a target Dedicated Core (DECOR) network.

It should be noted that the above-mentioned user terminal 1400 in this embodiment may be a user terminal in any of the method embodiments in the embodiments of the present disclosure, and any implementation of the user terminal in the method embodiments in the embodiments of the present disclosure may be used by the present disclosure. The above-mentioned user terminal 1400 in the embodiment is implemented and achieves the same beneficial effects, which are not repeated here.

Figure 21:
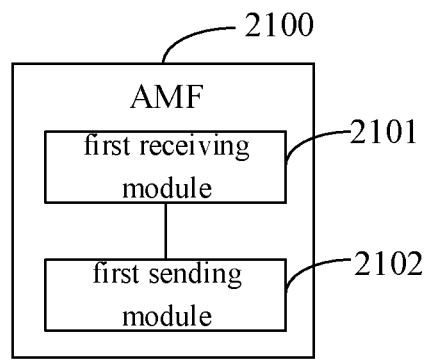
FIG. 21 is a schematic view of an AMF in some embodiments of the present disclosure.

Referring to FIG. 21 which is a schematic view of an AMF in some embodiments of the present disclosure. As shown in FIG. 21, the AMF 2100 includes:

a first receiving module 2101, configured to receive slice congestion information sent by a Session Management Function (SMF) or a Policy Control Function (PCF) of a target network slice; and a first sending module 2102, configured to send a message including the slice congestion information to a user terminal or a base station, where the slice congestion information is configured to enable the user terminal to back off, according to the slice congestion information, a target network slice corresponding to the slice congestion information.

Optionally, the slice congestion information is configured to indicate that the target network slice is congested, and the slice congestion information is configured to enable the user terminal to prohibit, according to the slice congestion information, the user terminal from initiating a session management request to the target network slice.

Optionally, the slice congestion information includes a backoff time, and the backoff time is configured to enable the user terminal to start a backoff timer with a timing time being the backoff time, and prohibit the user terminal from initiating a session management request to the target network slice until the backoff timer expires or stops.

Optionally, in the case that a value of a backoff time in the slice congestion information is not 0 and is not a deactive value and then the user terminal is running a backoff timer corresponding to the target network slice, the backoff timer is stopped, and the backoff timer is started after a timing time of the backoff timer is set to be the backoff time, and the user terminal is prohibited from initiating a session management request to the target network slice, until the backoff timer expires, until the backoff timer stops, until a Public Land Mobile Network (PLMN) connected to the user terminal changes, or until a Universal Subscriber Identity Module (USIM) of the user terminal is removed;

or,
in the case that a value of the backoff timer in the slice congestion information is a deactive value and then the user terminal is running a backoff timer corresponding to the target network slice, the backoff timer is stopped, and the user terminal is prohibited from initiating a session management request to the target network slice, until the user terminal is powered off, until a PLMN connected to the user terminal changes, or until a USIM of the user terminal is removed;

or,
in the case that the slice congestion information includes the backoff time with a value of 0 and then the user terminal is running the backoff timer corresponding to the target network slice, the backoff time is stopped.

Figure 22:
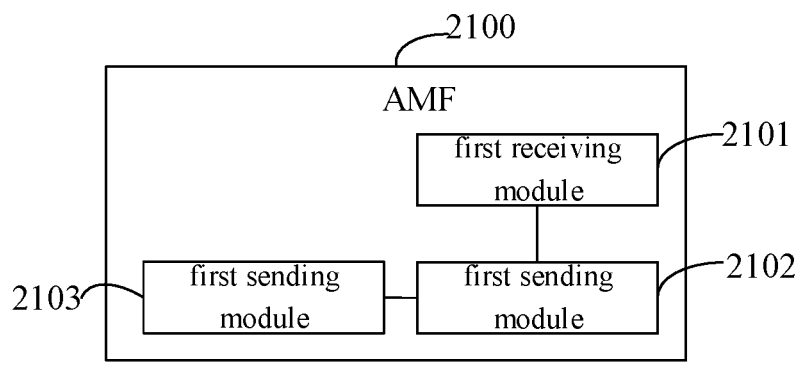
FIG. 22 is a schematic view of another AMF in some embodiments of the present disclosure.

Optionally, as shown in FIG. 22, the AMF 2100 further includes:
a second receiving module 2103, configured to receive a session establishment request sent by the user terminal, where the session establishment request is configured to request establishing a session connection to the target network slice;
the first sending module 2102 is further configured to send a session establishment reject message to the user terminal, where the session establishment reject message includes indication information indicating that the target network slice is congested and a backoff parameter.

Figure 23:
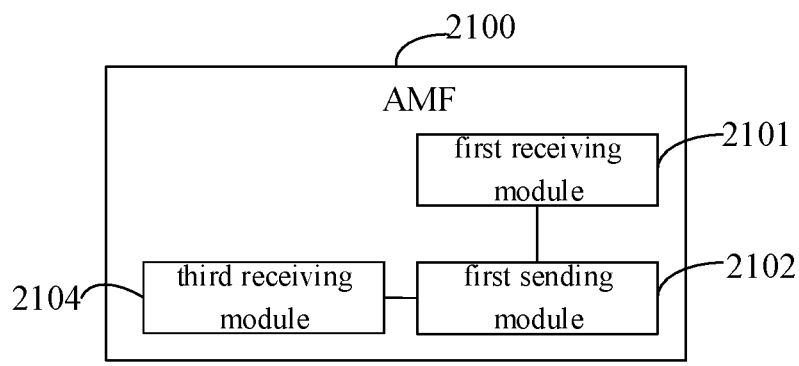
FIG. 23 is a schematic view of another AMF in some embodiments of the present disclosure.

Optionally, as shown in FIG. 23, the AMF 2100 further includes:
a third receiving module 2104, configured to receive a session modification request sent by the user terminal, where the session modification request is configured to request modifying a session connection of the user terminal in the target network slice;
the first sending module 2102 is further configured to send a session modification reject message to the user terminal, where the session modification reject message includes indication information indicating that the target network slice is congested and a backoff parameter.

Optionally, the first sending module 2102 is further configured to send a session release command to the user terminal, where the session release command includes indication information indicating that the target network slice is congested and a backoff parameter.

Figure 24:
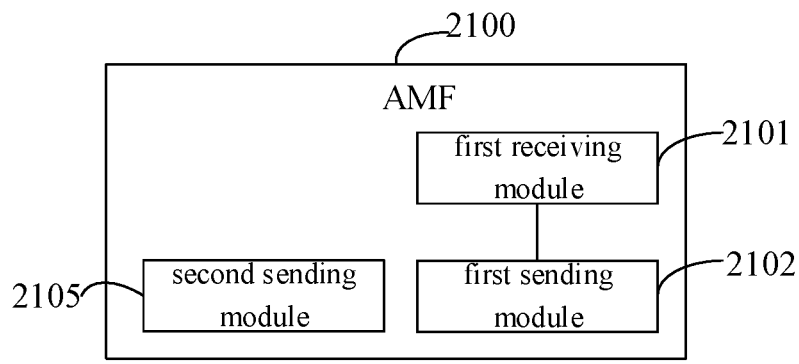
FIG. 24 is a schematic view of another AMF in some embodiments of the present disclosure.

Optionally, as shown in FIG. 24, the AMF 2100 further includes:
a second sending module 2105, configured to send a Non-access stratum (NAS) message to the user terminal, where the NAS message is configured to indicate that the target network slice is not congested.

Optionally, the first sending module 2102 is further configured to send a congestion start message to the base station, where the congestion start message is configured to indicate that the target network slice is congested, and the congestion start message includes a backoff parameter.

Figure 25:
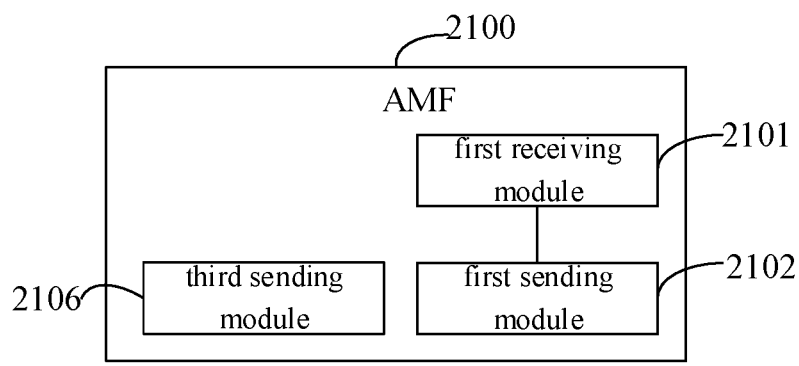
FIG. 25 is a schematic view of another AMF in some embodiments of the present disclosure.

Optionally, as shown in FIG. 25, the AMF 2100 further includes:
a third sending module 2106, configured to send a congestion stop message to the base station, where the congestion stop message is configured to indicate that the target network slice is not congested.

Optionally, the target network slice is a target Dedicated Core (DECOR) network.

It should be noted that the AMF 2100 in this embodiment may be an AMF in any embodiment of the method embodiment in the embodiment of the present disclosure, and any embodiment of the AMF in the method embodiment in the embodiment of the present disclosure may be adopted by the present embodiment. The above AMF2100 achieves and achieves the same beneficial effects, which will not be repeated here.

Figure 26:
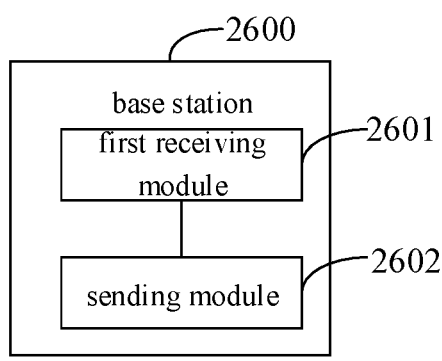
FIG. 26 is a schematic view of a base station in some embodiments of the present disclosure.

Referring to FIG. 26 which is a schematic view of a base station in some embodiments of the present disclosure. As shown in FIG. 26, the base station 2600 includes:
a first receiving module 2601 configured to receive a congestion start message sent by an Authentication Management Function (AMF); and
a sending module 2602, configured to send a message including the slice congestion information to a user terminal, where the slice congestion information is configured to enable the user terminal to back off, according to the slice congestion information, a target network slice corresponding to the slice congestion information.

Optionally, the congestion start message is configured to indicate that the target network slice is congested, the slice congestion information is configured to indicate that the target network slice is congested, and the slice congestion information is configured to enable the user terminal to prohibit, according to the slice congestion information, the user terminal from initiating a session management request to the target network slice.

Figure 27:
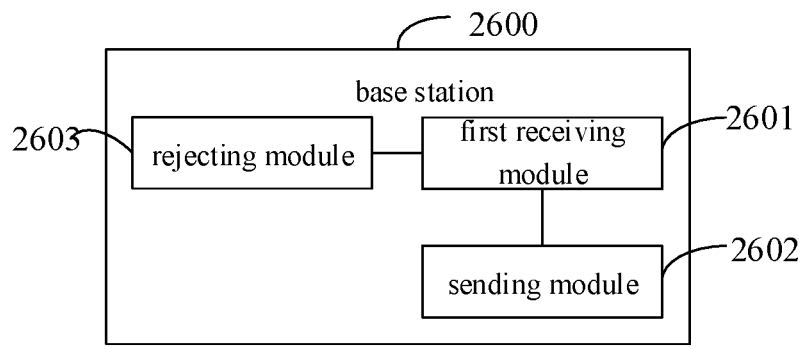
FIG. 27 is a schematic view of another base station in some embodiments of the present disclosure.

Optionally, as shown in FIG. 27, the base station 2600 further includes:
a rejecting module 2603, configured to reject a Radio Resource Control (RRC) signaling including slice information of the target network slice.

Figure 28:
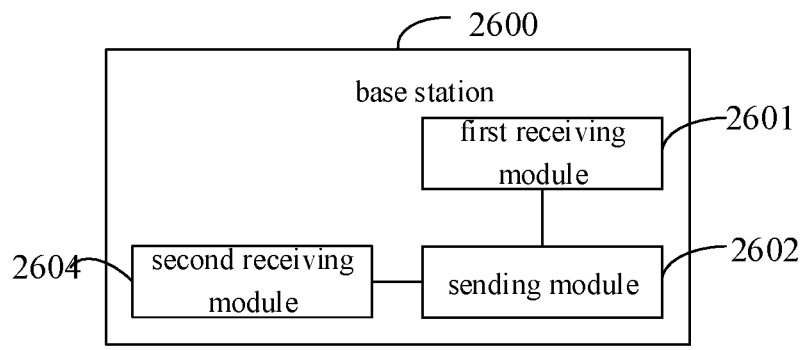
FIG. 28 is a schematic view of another base station in some embodiments of the present disclosure.

Optionally, as shown in FIG. 28, the base station 2600 further includes:
a second receiving module 2604, configured to receive an access stratum (AS) message sent by the user terminal, where the AS message includes an NAS message and an access parameter, and the access parameter includes slice information of the target network slice;
the sending module 2602 is further configured to send an AS reject message to the user terminal, where the AS reject message includes indication information indicating that the target network slice is congested and a backoff time.

Optionally, the NAS message includes a registration request message.

Optionally, the access parameter includes the slice information of at least two network slices, the at least two network slices include the target network slice, and the AS reject message further includes the slice information of the target network slice.

Figure 29:
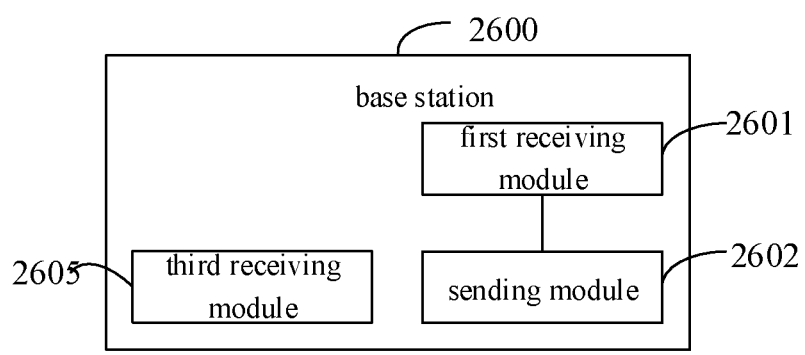
FIG. 29 is a schematic view of another base station in some embodiments of the present disclosure.

Optionally, as shown in FIG. 29, the user terminal 1400 further includes:
a third receiving module 2605, configured to receive a congestion stop message sent by the AMF, where the congestion stop message is configured to indicate that the target network slice is not congested.

Optionally, the target network slice is a target Dedicated Core (DECOR) network.

It should be noted that the above-mentioned base station 2600 in this embodiment may be a base station of any embodiment in the method embodiment in this embodiment of the present disclosure, and any embodiment of the base station in the method embodiment of this embodiment of the present disclosure may be used in this embodiment The above-mentioned base station 2600 is implemented, and the same beneficial effects are achieved, which will not be repeated here.

Figure 30:
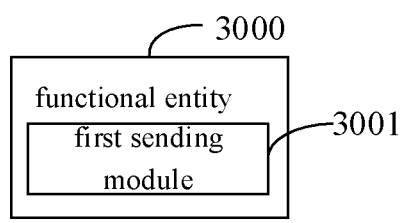
FIG. 30 is a schematic view of a functional entity in some embodiments of the present disclosure.

Referring to FIG. 30 which is a schematic view of a functional entity in some embodiments of the present disclosure. The functional entity is SMF or PCF. As shown in FIG. 30, the functional entity 3000 includes:
- a first sending module 3001, configured to send slice congestion information to an Authentication Management Function (AMF), where the slice congestion information is configured to enable the AMF to send a message including the slice congestion information to a user terminal or a base station, where the slice congestion information is configured to enable the user terminal to back off, according to the slice congestion information, a target network slice corresponding to the slice congestion information.

Optionally, the slice congestion information is configured to indicate that the target network slice is congested.

Figure 31:
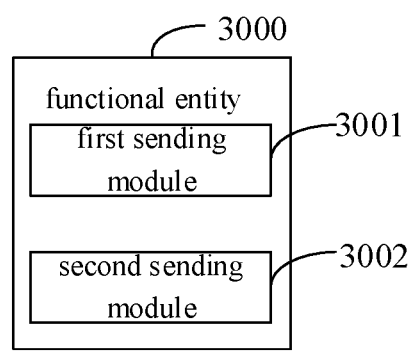
FIG. 31 is a schematic view of another functional entity in some embodiments of the present disclosure.

Optionally, as shown in FIG. 31, the functional entity 3000 further includes:
- a second sending module 3002, configured to send a congestion stop message to the AMF, where the congestion stop message is configured to indicate that the target network slice is not congested.

Figure 32:
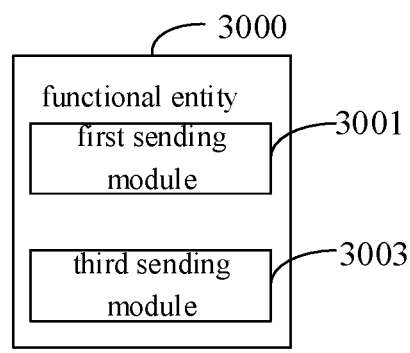
FIG. 32 is a schematic view of another functional entity in some embodiments of the present disclosure.

Optionally, as shown in FIG. 32, the functional entity 3000 further includes:
- a third sending module 3003, configured to send a Non-access stratum (NAS) message to the user terminal, where the NAS message is configured to indicate that the target network slice is not congested, to enable the user terminal to stop a backoff timer corresponding to the target network slice.

It should be noted that the above functional entity 3000 in this embodiment may be a functional entity in any embodiment of the method embodiment in the embodiment of the present disclosure, and any embodiment of the functional entity in the method embodiment in the embodiment of the present disclosure may be implemented by the present disclosure. The above functional entity 3000 in the embodiment is implemented and achieves the same beneficial effects, which will not be repeated here.

Figure 33:
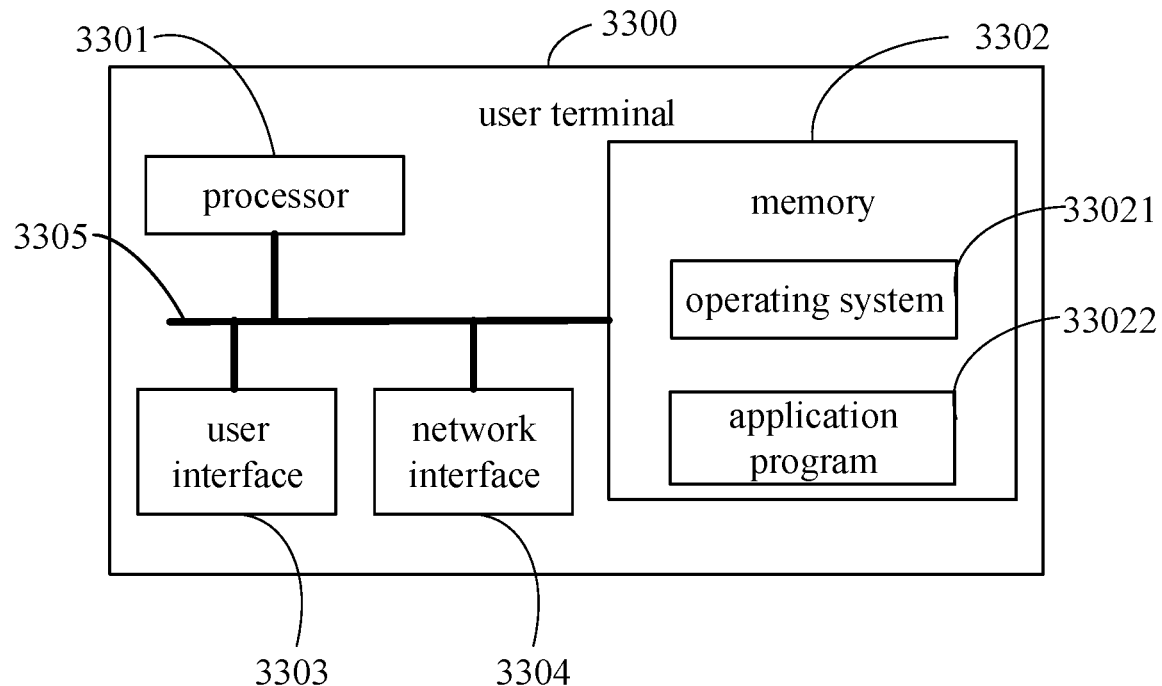
FIG. 33 is a schematic view of another user terminal in some embodiments of the present disclosure.

Referring to FIG. 33 which is a schematic view of a user terminal in some embodiments of the present disclosure. As shown in FIG. 33, the user terminal 3300 includes: at least one processor 3301, a memory 3302, at least one network interface 3304, and a user interface 3303. The various components in the user terminal 3300 are coupled together through a bus system 3305. It can be understood that the bus system 3305 is configured to implement connection and communication between these components. The bus system 3305 includes a power bus, a control bus, and a status signal bus in addition to the data bus. However, for the sake of clarity, various buses are marked as the bus system 3305 in FIG. 33.

The user interface 3303 may include a display, a keyboard, or a pointing device (for example, a mouse, a track ball, a touch pad, or a touch screen).

It can be understood that the memory 3302 in the embodiment of the present disclosure may be a volatile memory or a non-volatile memory, or may include both volatile and non-volatile memories. The non-volatile memory may be a read-only memory (ROM), a programmable read-only memory (PROM), an erasable programmable read-only memory (EROM), or Erase programmable EPROM (EEPROM) or flash memory. The volatile memory may be a Random Access Memory (RAM), which is used as an external cache. By way of example, but not limitation, many forms of RAM are available, such as Static Random Access Memory (SRAM), Dynamic Random Access Memory (DRAM), Synchronous Dynamic Random Access Memory (Synchronous DRAM, SDRAM), double data rate synchronous dynamic random access memory (Double Data Rate SDRAM, DDRSDRAM), enhanced synchronous dynamic random access memory (Enhanced SDRAM, ESDRAM), synchronous connection dynamic random access memory (Synch link DRAM, SLDRAM) Direct memory bus random access memory (Direct Rambus RAM, DRRAM). The memory 3302 of the systems and methods described herein is intended to include, but is not limited to, these and any other suitable types of memory.

In some embodiments, the memory 3302 stores the following elements, executable modules or data structures, or a subset of them, or their extended set: an operating system 33021 and an application program 33022.

The operating system 33021 includes various system programs, such as a framework layer, a core library layer, and a driver layer, etc., for implementing various basic services and processing hardware-based tasks. The application program 33022 includes various application programs, such as a media player (Media Player), a browser (Browser), etc., and is configured to implement various application services. A program for implementing the method of the embodiment of the present disclosure may be included in an application program 33022.

In the embodiment of the present disclosure, the user terminal 3300 further includes a program for processing network slice based congestion stored in the memory 3302 and executable on the processor 3301. Specifically, the program may be a program for processing network slice based congestion stored in the application program 8022. The program of processing the network slice based congestion is executed by the processor 3301 to perform:
- receiving a message sent by a network including slice congestion information; and
- backing off a target network slice corresponding to the slice congestion information, according to the slice congestion information.

The method disclosed in the foregoing embodiment of the present disclosure may be performed by the processor 3301, or implemented by the processor 3301. The processor 3301 may be an integrated circuit chip with signal processing capabilities. In the implementation process, each step of the above method may be completed by an integrated logic circuit of hardware in the processor 3301 or an instruction in the form of software. The above processor 3301 may be a general-purpose processor, a digital signal processor (DSP), an application specific integrated circuit (ASIC), a ready-made programmable gate array (Field Programmable Gate Array, FPGA), or other Programming logic devices, discrete gate or transistor logic devices, discrete hardware components. Various methods, steps, and logical block diagrams disclosed in the embodiments of the present disclosure may be implemented or executed. A general-purpose processor may be a microprocessor or the processor may be any conventional processor or the like. The steps of the method disclosed in combination with the embodiments of the present disclosure may be directly implemented by a hardware decoding processor, or may be performed by using a combination of hardware and software modules in the decoding processor. A software module may be located in a mature storage medium such as a random access memory, a flash memory, a read-only memory, a programmable read-only memory, or an electrically erasable programmable memory, a register, and the like. The storage medium is located in the memory 3302, and the processor 3301 reads the information in the memory 3302 and completes the steps of the foregoing method in combination with its hardware.

It can be understood that the embodiments described herein may be implemented by hardware, software, firmware, middleware, microcode, or a combination thereof. For hardware implementation, the processing unit can be implemented in one or more Application Specific Integrated Circuits (ASIC), Digital Signal Processing (DSP), Digital Signal Processing Equipment (DSPD), and programmable logic. Programmable Logic Device (PLD), Field-Programmable Gate Array (FPGA), general-purpose processor, controller, microcontroller, microprocessor, and other electronic units for performing the functions described in this application or a combination thereof.

For software implementation, the techniques described herein can be implemented through modules (e.g., procedures, functions, etc.) that perform the functions described herein. Software codes may be stored in a memory and executed by a processor. The memory may be implemented in the processor or external to the processor.

Optionally, the slice congestion information is configured to indicate that the target network slice is congested;
the backing off the target network slice corresponding to the slice congestion information according to the slice congestion information performed by the processor 3301 includes:
prohibiting the user terminal from initiating a session management request to the target network slice, according to the slice congestion information.

Optionally, the slice congestion information includes a backoff time;
the backing off the target network slice corresponding to the slice congestion information according to the slice congestion information performed by the processor 3301 includes:
starting a backoff timer with a timing time being the backoff time, and prohibiting the user terminal from initiating a session management request to the target network slice until the backoff timer expires or stops.

Optionally, the backing off the target network slice corresponding to the slice congestion information according to the slice congestion information performed by the processor 3301 includes:
in the case that the user terminal is running a backoff timer corresponding to the target network slice and a value of a backoff time in the slice congestion information is not 0 and is not a deactive value, stopping the backoff timer, and starting the backoff timer after a timing time of the backoff timer is set to be the backoff time, and prohibiting the user terminal from initiating a session management request to the target network slice, until the backoff timer expires, until the backoff timer stops, until a Public Land Mobile Network (PLMN) connected to the user terminal changes, or until a Universal Subscriber Identity Module (USIM) of the user terminal is removed;
or
in the case that the user terminal is running a backoff timer corresponding to the target network slice and a value of the backoff timer in the slice congestion information is a deactive value, stopping the backoff timer, and prohibiting the user terminal from initiating a session management request to the target network slice, until the user terminal is powered off, until a PLMN connected to the user terminal changes, or until a USIM of the user terminal is removed.

Optionally, subsequent to the receiving the message sent by the network and including the slice congestion information, the program of processing the network slice based congestion is executed by the processor 3301 to perform:
in the case that the user terminal is running the backoff timer corresponding to the target network slice and the slice congestion information includes the backoff time with a value of 0, stopping the backoff timer.

Optionally, in the case that the user terminal is powered off, the backoff timer continues to run during the user terminal is powered off.

Optionally, the session management request includes a packet data unit session connection establishment request or a packet data unit session connection modification request.

Optionally, prior to the receiving the message sent by the network and including the slice congestion information, the program of processing the network slice based congestion is executed by the processor 3301 to perform:
sending a session establishment request to an Authentication Management Function (AMF), where the session establishment request is configured to request establishing a session connection to the target network slice;
the receiving the message sent by the network and including the slice congestion information includes:
receiving a session establishment reject message sent by the AMF, where the session establishment reject message includes indication information indicating that the target network slice is congested and a backoff parameter.

Optionally, prior to the receiving the message sent by the network and including the slice congestion information, the program of processing the network slice based congestion is executed by the processor 3301 to perform:
sending a session modification request to an AMF, where the session modification request is configured to request modifying a session connection of the user terminal in the target network slice;
the receiving the message sent by the network and including the slice congestion information includes:
receiving a session modification reject message sent by the AMF, where the session modification reject message includes indication information indicating that the target network slice is congested and a backoff parameter.

Optionally, the receiving the message sent by the network and including the slice congestion information preformed by the processor 3301 includes:
receiving a session release command sent by an AMF, where the session release command includes indication information indicating that the target network slice is congested and a backoff parameter.

Optionally, subsequent to the receiving the session release command sent by the AMF, the program of processing the network slice based congestion is executed by the processor 3301 to perform:
releasing a session resource of the target network slice.

Optionally, prior to the receiving the message sent by the network and including the slice congestion information, the program of processing the network slice based congestion is executed by the processor 3301 to perform:
sending an access stratum (AS) message to a base station, where the AS message includes a Non-access stratum (NAS) message and access stratum parameters, and the access stratum parameters include slice information of the target network slice;

the receiving the message sent by the network and including the slice congestion information includes:
receiving an AS reject message sent by the base station, where the AS reject message includes indication information indicating that the target network slice is congested and a backoff time.

Optionally, the backing off the target network slice corresponding to the slice congestion information according to the slice congestion information performed by the processor 3301 includes:
starting a backoff timer with a timing time being the backoff time in the AS, where until the backoff timer expires or stops, the user terminal is prohibited from sending a Radio Resource Control (RRC) message including the slice information of the target network slice; or
notifying the NAS that the target network slice is congested and the backoff time, and starting a backoff timer with a timing time being the backoff time in the NAS, where until the backoff timer expires or stops, the user terminal is prohibited from sending the NAS message for requesting a service from the target network slice.

Optionally, the NAS message includes a registration request message.

Optionally, the access parameter includes the slice information of at least two network slices, and the at least two network slices include the target network slice,
the AS reject message further includes the slice information of the target network slice.

Optionally, subsequent to the backing off the target network slice corresponding to the slice congestion information according to the slice congestion information, the program of processing the network slice based congestion is executed by the processor 3301 to perform:
receiving an NAS message sent by an AMF or a Session Management Function (SMF) of the target network slice, where the NAS message is configured to indicate that the target network slice is not congested; and
stopping the backoff timer.

Optionally, the target network slice is a target Dedicated Core (DECOR) network.

It should be noted that the user terminal 3300 in this embodiment may be a user terminal in any of the method embodiments in the embodiments of the present disclosure, and any implementation of the user terminal in the method embodiments in the embodiments of the present disclosure may be implemented by the present The above-mentioned user terminal 3300 in the embodiment is implemented and achieves the same beneficial effects, and details are not described herein again.

Figure 34:
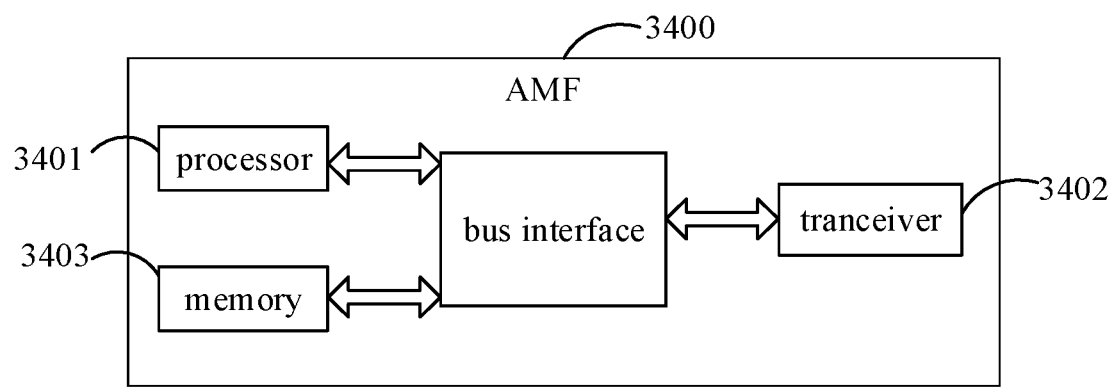
FIG. 34 is a schematic view of another AMF in some embodiments of the present disclosure.

Referring to FIG. 34 which is a schematic view of an AMF in some embodiments of the present disclosure. As shown in FIG. 34, the AMF 3400 includes: a processor 3401, a transceiver 3402, a memory 3403, and a bus interface, where:

In the embodiment of the present disclosure, the AMF 3400 further includes a program of processing network slice based congestion stored in the memory 3403 and running on the processor 3401. The program of processing network slice based congestion is executed by the processor 3401 to perform:
receiving slice congestion information sent by a Session Management Function (SMF) or a Policy Control Function (PCF) of a target network slice; and
sending a message including the slice congestion information to a user terminal or a base station, where the slice congestion information is configured to enable the user terminal to back off, according to the slice congestion information, a target network slice corresponding to the slice congestion information.

The transceiver 3402 is configured to receive and send data under the control of the processor 3401. The transceiver 3402 includes at least two antenna ports.

In FIG. 34, the bus architecture may include any number of interconnected buses and bridges, and one or more processors specifically represented by the processor 3401 and various circuits of the memory represented by the memory 3403 are linked together. The bus architecture can also link various other circuits such as peripherals, voltage regulators, and power management circuits, which are well known in the art, so they are not further described herein. The bus interface provides an interface. The transceiver 3402 may be multiple elements, including a transmitter and a receiver, providing a unit for communicating with various other devices over a transmission medium. For different user devices, the user interface 3404 may also be an interface capable of externally connecting and connecting the required devices. The connected devices include, but are not limited to, a keypad, a display, a speaker, a microphone, a joystick, and the like.

The processor 3401 is configured to manage the bus architecture and general processing, and the memory 3403 can store data used by the processor 3401 when performing operations.

Optionally, the slice congestion information is configured to indicate that the target network slice is congested, and the slice congestion information is configured to enable the user terminal to prohibit, according to the slice congestion information, the user terminal from initiating a session management request to the target network slice.

Optionally, the slice congestion information includes a backoff time, and the backoff time is configured to enable the user terminal to start a backoff timer with a timing time being the backoff time, and prohibit the user terminal from initiating a session management request to the target network slice until the backoff timer expires or stops.

Optionally, in the case that a value of a backoff time in the slice congestion information is not 0 and is not a deactive value and then the user terminal is running a backoff timer corresponding to the target network slice, stopping the backoff timer, and starting the backoff timer after a timing time of the backoff timer is set to be the backoff time, and prohibiting the user terminal from initiating a session management request to the target network slice, until the backoff timer expires, until the backoff timer stops, until a Public Land Mobile Network (PLMN) connected to the user terminal changes, or until a Universal Subscriber Identity Module (USIM) of the user terminal is removed;
or,
in the case that a value of the backoff timer in the slice congestion information is a deactive value and then the user terminal is running a backoff timer corresponding to the target network slice, stopping the backoff timer, and prohibiting the user terminal from initiating a session management request to the target network slice, until the user terminal is powered off, until a PLMN connected to the user terminal changes, or until a USIM of the user terminal is removed;
or,
in the case that the slice congestion information includes the backoff time with a value of 0 and then the user terminal is running the backoff timer corresponding to the target network slice, stopping the backoff timer.

Optionally, subsequent to the receiving the slice congestion information sent by the SMF or the PCF of the target network slice and prior to the sending the message including the slice congestion information to the user terminal, the program of processing the network slice based congestion is executed by the processor 3401 to perform:

receiving a session establishment request sent by the user terminal, where the session establishment request is configured to request establishing a session connection to the target network slice;

the sending the message including the slice congestion information to the user terminal performed by the processor 3401 includes:

sending a session establishment reject message to the user terminal, where the session establishment reject message includes indication information indicating that the target network slice is congested and a backoff parameter.

Optionally, subsequent to the receiving the slice congestion information sent by the SMF or the PCF of the target network slice and prior to the sending the message including the slice congestion information to the user terminal, the program of processing the network slice based congestion is executed by the processor 3401 to perform:

receiving a session modification request sent by the user terminal, where the session modification request is configured to request modifying a session connection of the user terminal in the target network slice;

the sending the message including the slice congestion information to the user terminal includes:

sending a session modification reject message to the user terminal, where the session modification reject message includes indication information indicating that the target network slice is congested and a backoff parameter.

Optionally, the sending the message including the slice congestion information to the user terminal performed by the processor 3401 includes:

sending a session release command to the user terminal, where the session release command includes indication information indicating that the target network slice is congested and a backoff parameter.

Optionally, subsequent to the sending the message including the slice congestion information to the user terminal, the program of processing the network slice based congestion is executed by the processor 3401 to perform:

sending a Non-access stratum (NAS) message to the user terminal, where the NAS message is configured to indicate that the target network slice is not congested.

Optionally, the sending the message including the slice congestion information to the base station performed by the processor 3401 includes:

sending a congestion start message to the base station, where the congestion start message is configured to indicate that the target network slice is congested, and the congestion start message includes a backoff parameter.

Optionally, subsequent to the sending the congestion start message to the base station, the program of processing the network slice based congestion is executed by the processor 3401 to perform:

sending a congestion stop message to the base station, where the congestion stop message is configured to indicate that the target network slice is not congested.

Optionally, the target network slice is a target Dedicated Core (DECOR) network.

It should be noted that the above-mentioned AMF 3400 in this embodiment may be an AMF in any embodiment in the method embodiment in the embodiment of the present disclosure, and any embodiment of the AMF in the method embodiment in the embodiment of the present disclosure may be used in this embodiment. The above AMF 3400 achieves and achieves the same beneficial effects, which will not be repeated here.

Figure 35:
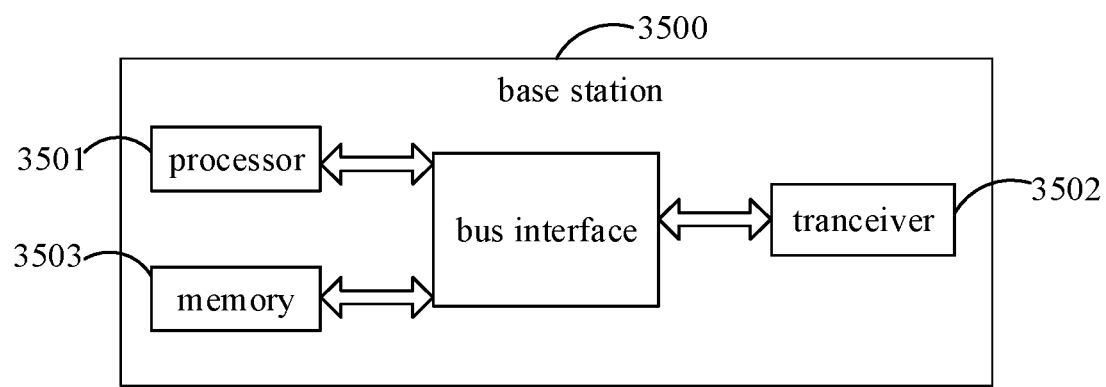
FIG. 35 is a schematic view of another base station in some embodiments of the present disclosure.

Referring to FIG. 35 which is a schematic view of a base station in some embodiments of the present disclosure. As shown in FIG. 35, the base station 3500 includes: a processor 3501, a transceiver 3502, a memory 3503, and a bus interface, where:

In the embodiment of the present disclosure, the base station 3500 further includes a program for processing network slice based congestion stored in the memory 3503 and executable on the processor 3501. The program of processing network slice based congestion is executed by the processor 3501 to perform:

receiving a congestion start message sent by an Authentication Management Function (AMF); and sending a message including the slice congestion information to a user terminal, where the slice congestion information is configured to enable the user terminal to back off, according to the slice congestion information, a target network slice corresponding to the slice congestion information.

The transceiver 3502 is configured to receive and send data under the control of the processor 3501. The transceiver 3502 includes at least two antenna ports.

In FIG. 35, the bus architecture may include any number of interconnected buses and bridges, and one or more processors specifically represented by the processor 3501 and various circuits of the memory represented by the memory 3503 are linked together. The bus architecture can also link various other circuits such as peripherals, voltage regulators, and power management circuits, which are well known in the art, so they are not further described herein. The bus interface provides an interface. The transceiver 3502 may be multiple elements, including a transmitter and a receiver, providing a unit for communicating with various other devices over a transmission medium. For different user equipment, the user interface 3504 can also be an interface capable of externally connecting and connecting the required equipment. The connected equipment includes, but is not limited to, a keypad, a display, a speaker, a microphone, a joystick, and the like.

The processor 3501 is configured to manage the bus architecture and general processing, and the memory 3503 can store data used by the processor 3501 when performing operations.

Optionally, the congestion start message is configured to indicate that the target network slice is congested, the slice congestion information is configured to indicate that the target network slice is congested, and the slice congestion information is configured to enable the user terminal to prohibit, according to the slice congestion information, the user terminal from initiating a session management request to the target network slice.

Optionally, subsequent to the receiving the congestion start message sent by the AMF, the program of processing the network slice based congestion is executed by the processor 3501 to perform:

rejecting a Radio Resource Control (RRC) signaling including slice information of the target network slice.

Optionally, subsequent to the receiving the congestion start message sent by the AMF and prior to the sending the message including the slice congestion information to the user terminal, the program of processing the network slice based congestion is executed by the processor 3501 to perform:

receiving an access stratum (AS) message sent by the user terminal, where the AS message includes an NAS message and an access parameter, and the access parameter includes slice information of the target network slice;

The sending the message including the slice congestion information to the user terminal performed by the processor 3501 includes:

sending an AS reject message to the user terminal, where the AS reject message includes indication information indicating that the target network slice is congested and a backoff time.

Optionally, the NAS message includes a registration request message.

Optionally, the access parameter includes the slice information of at least two network slices, the at least two network slices include the target network slice, and the AS reject message further includes the slice information of the target network slice.

Optionally, subsequent to the sending the message including the slice congestion information to the user terminal, the program of processing the network slice based congestion is executed by the processor 3501 to perform:

receiving a congestion stop message sent by the AMF, where the congestion stop message is configured to indicate that the target network slice is not congested.

Optionally, the target network slice is a target Dedicated Core (DECOR) network.

It should be noted that the base station 3500 in this embodiment may be a base station of any embodiment in the method embodiment of the present disclosure, and any embodiment of the base station in the method implementation of the embodiment of the present disclosure may be used in this embodiment. The above-mentioned base station 3500 is implemented and achieves the same beneficial effects, which will not be repeated here.

Figure 36:
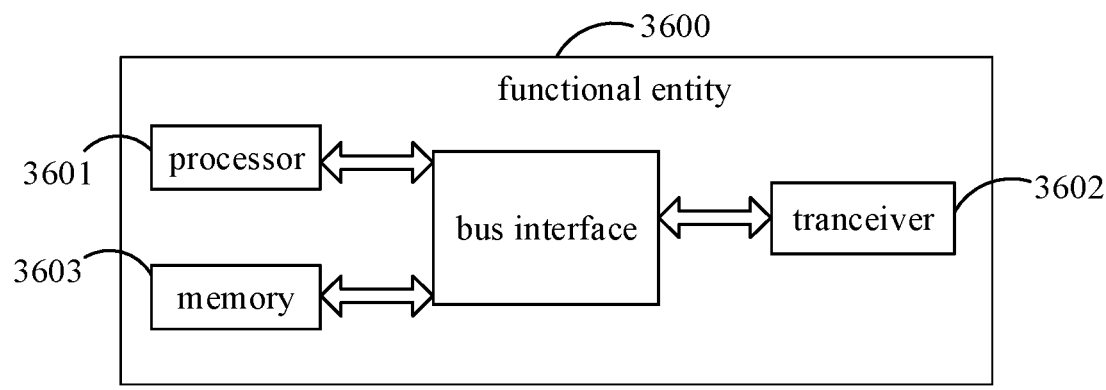
FIG. 36 is a schematic view of another functional entity in some embodiments of the present disclosure.

Referring to FIG. 36 which is a schematic view of a functional entity in some embodiments of the present disclosure. The functional entity is SMF or PCF. As shown in FIG. 36, the functional entity 3600 includes: a processor 3601, a transceiver 3602, a memory 3603, and a bus interface, among which:

In the embodiment of the present disclosure, the functional entity 3600 further includes a program for processing network slice based congestion stored in the memory 3603 and executable on the processor 3601. The program of processing network slice based congestion is executed by the processor 3601 to perform:

sending slice congestion information to an Authentication Management Function (AMF), where the slice congestion information is configured to enable the AMF to send a message including the slice congestion information to a user terminal or a base station, where the slice congestion information is configured to enable the user terminal to back off, according to the slice congestion information, a target network slice corresponding to the slice congestion information.

The transceiver 3602 is configured to receive and send data under the control of the processor 3601. The transceiver 3602 includes at least two antenna ports.

In FIG. 36, the bus architecture may include any number of interconnected buses and bridges, and one or more processors specifically represented by the processor 3601 and various circuits of the memory represented by the memory 3603 are linked together. The bus architecture can also link various other circuits such as peripherals, voltage regulators, and power management circuits, which are well known in the art, so they are not further described herein. The bus interface provides an interface. The transceiver 3602 may be multiple elements, including a transmitter and a receiver, providing a unit for communicating with various other devices over a transmission medium. For different user devices, the user interface 3604 may also be an interface capable of externally connecting and connecting the required devices. The connected devices include, but are not limited to, a keypad, a display, a speaker, a microphone, a joystick, and the like.

The processor 3601 is configured to manage the bus architecture and general processing, and the memory 3603 can store data used by the processor 3601 when performing operations.

Optionally, the slice congestion information is configured to indicate that the target network slice is congested.

Optionally, subsequent to the sending slice congestion information to the AMF, the program of processing the network slice based congestion is executed by the processor 3601 to perform:

sending a congestion stop message to the AMF, where the congestion stop message is configured to indicate that the target network slice is not congested.

Optionally, subsequent to the sending slice congestion information to the AMF, the program of processing the network slice based congestion is executed by the processor 3601 to perform:

sending a Non-access stratum (NAS) message to the user terminal, where the NAS message is configured to indicate that the target network slice is not congested, to enable the user terminal to stop a backoff timer corresponding to the target network slice It should be noted that the functional entity 3600 in this embodiment may be a functional entity of any embodiment in the method embodiment in the embodiment of the present disclosure, and any implementation of the functional entity in the method embodiment in the embodiment of the present disclosure may be implemented by the present disclosure. The above-mentioned functional entity 3600 in the embodiment is implemented and achieves the same beneficial effects, which will not be repeated here.

A computer-readable storage medium is provided in some embodiments of the present disclosure, where a program for processing a network slice based congestion stored in the computer-readable storage medium, where the program for processing the network slice based congestion is executed by a processor to perform the method of processing a network slice based congestion hereinabove.

A computer-readable storage medium is provided in some embodiments of the present disclosure, where a program for processing a network slice based congestion stored in the computer-readable storage medium, where the program for processing the network slice based congestion is executed by a processor to perform the method of processing a network slice based congestion hereinabove.

A computer-readable storage medium is provided in some embodiments of the present disclosure, where a program for processing a network slice based congestion stored in the computer-readable storage medium, where the program for processing the network slice based congestion is executed by a processor to perform the method of processing a network slice based congestion hereinabove.

A computer-readable storage medium is provided in some embodiments of the present disclosure, where a program for processing a network slice based congestion stored in the computer-readable storage medium, where the program for processing the network slice based congestion is executed by a processor to perform the method of processing a network slice based congestion hereinabove.

Those of ordinary skill in the art may realize that the units and algorithm steps of each example described in combination with the embodiments disclosed herein can be implemented by electronic hardware, or a combination of computer software and electronic hardware. Whether these functions are performed in hardware or software depends on the specific application and design constraints of the technical solution. A person skilled in the art can use different methods to implement the described functions for each specific application, but such implementation should not be considered to be beyond the scope of the present disclosure.

Those skilled in the art can clearly understand that, for the convenience and brevity of description, the specific working processes of the systems, devices, and units described above can refer to the corresponding processes in the foregoing method embodiments, and are not repeated here.

In the embodiments provided in this application, it should be understood that the disclosed apparatus and method may be implemented in other ways. For example, the device embodiments described above are only schematic. For example, the division of the unit is only a logical function division. In actual implementation, there may be another division manner. For example, multiple units or components may be combined or can be integrated into another system, or some features can be ignored or not implemented. In addition, the displayed or discussed mutual coupling or direct coupling or communication connection may be indirect coupling or communication connection through some interfaces, devices or units, which may be electrical, mechanical or other forms.

The units described as separate components may or may not be physically separated, and the components displayed as units may or may not be physical units, that is, may be located in one place, or may be distributed on multiple network units. Some or all of the units may be selected according to actual needs to achieve the objectives of the solutions of the embodiments of the present disclosure.

In addition, each functional unit in each embodiment of the present disclosure may be integrated into one processing unit, or each unit may exist separately physically, or two or more units may be integrated into one unit.

When the functions are implemented in the form of software functional units and sold or used as independent products, they can be stored in a computer-readable storage medium. Based on this understanding, the technical solution of the present disclosure is essentially a part that contributes to the existing technology or a part of the technical solution can be embodied in the form of a software product. The computer software product is stored in a storage medium, including Several instructions are used to cause a computer device (which may be a personal computer, a server, or a network device, etc.) to perform all or part of the steps of the method described in various embodiments of the present disclosure. The foregoing storage medium includes various media that can store program codes, such as a U disk, a mobile hard disk, a ROM, a RAM, a magnetic disk, or an optical disk.

The above are only some embodiments of the present disclosure, but the scope of the present disclosure is not limited herein. Those skilled in the art may also make several improvements and replacements without departing from the principle of the present disclosure, which should be considered as the scope of the present disclosure. Therefore, the scope of the present disclosure shall be subject to the scope of the claims.

What is claimed is:

1. A method of processing a network slice based congestion, performed by a user terminal, characterized in that the method comprises:
   receiving a message sent by a network comprising slice congestion information
   backing off a target network slice corresponding to the slice congestion information, according to the slice congestion information;
   wherein the receiving the message sent by the network comprising slice congestion information comprises:
   receiving a session release command sent by an Access and Mobility Management Function (AMF), wherein the session release command comprises indication information indicating that the target network slice is congested and a backoff parameter, wherein the slice congestion information comprises the indication information and the backoff parameter.

2. The method according to claim 1, wherein the slice congestion information is configured to indicate that the target network slice is congested, and the backing off the target network slice corresponding to the slice congestion information according to the slice congestion information comprises:
   prohibiting the user terminal from initiating a session management request to the target network slice, according to the slice congestion information.

3. The method according to claim 1, wherein the slice congestion information comprises a backoff time; the backing off the target network slice corresponding to the slice congestion information according to the slice congestion information comprises:
   starting a backoff timer with a timing time being the backoff time, and prohibiting the user terminal from initiating a session management request to the target network slice until the backoff timer expires or stops.

4. The method according to claim 1, wherein the backing off the target network slice corresponding to the slice congestion information according to the slice congestion information comprises:
   in the case that the user terminal is running a backoff timer corresponding to the target network slice and a value of a backoff time in the slice congestion information is not 0 and is not a deactive value, stopping the backoff timer, and starting the backoff timer after a timing time of the backoff timer is set to be the backoff time, and prohibiting the user terminal from initiating a session management request to the target network slice, until the backoff timer expires, until the backoff timer stops, until a Public Land Mobile Network, PLMN, connected to the user terminal changes, or until a Universal Subscriber Identity Module, USIM, of the user terminal is removed;
   or
   in the case that the user terminal is running a backoff timer corresponding to the target network slice and a value of the backoff timer in the slice congestion information is a deactive value, stopping the backoff timer, and prohibiting the user terminal from initiating a session management request to the target network slice, until the user terminal is powered off, until a PLMN connected to the user terminal changes, or until a USIM of the user terminal is removed.

5. The method according to claim 4, wherein subsequent to the receiving the message sent by the network comprising slice congestion information, the method further comprises:
in the case that the user terminal is running the backoff timer corresponding to the target network slice and the slice congestion information comprises the backoff time with a value of 0, stopping the backoff timer.

6. The method according to claim 3, wherein in the case that the user terminal is powered off, the backoff timer continues to run during the user terminal is powered off.

7. The method according to claim 2, wherein the session management request comprises a packet data unit session connection establishment request or a packet data unit session connection modification request.

8. The method according to claim 1, wherein
prior to the receiving the session release command sent by the AMF, the method further comprises:
sending a session establishment request to the AMF, wherein the session establishment request is configured to request establishing a session connection to the target network slice;
the receiving the message sent by the network comprising the slice congestion information comprises:
receiving a session establishment reject message sent by the AMF, wherein the session establishment reject message comprises indication information indicating that the target network slice is congested and the backoff parameter.

9. The method according to claim 1, wherein
subsequent to the receiving the session release command sent by the AMF, the method further comprises:
releasing a session resource of the target network slice.

10. A method of processing a network slice based congestion, performed by an Authentication Management Function (AMF), characterized in that the method comprises:
receiving slice congestion information sent by a Session Management Function (SMF) or a Policy Control Function (PCF) of a target network slice; and
sending a message comprising the slice congestion information to a user terminal or a base station, wherein the slice congestion information is configured to enable the user terminal to back off, according to the slice congestion information, a target network slice corresponding to the slice congestion information;
wherein the sending the message comprising the slice congestion information to the user terminal comprises:
sending a session release command to the user terminal, wherein the session release command comprises indication information indicating that the target network slice is congested and a backoff parameter, wherein the slice congestion information comprises the indication information and the backoff parameter.

11. The method according to claim 10, wherein
subsequent to the receiving the slice congestion information sent by the SMF or the PCF of the target network slice and prior to the sending the message comprising the slice congestion information to the user terminal, the method further comprises:
receiving a session establishment request sent by the user terminal, wherein the session establishment request is configured to request establishing a session connection to the target network slice;
the sending the message comprising the slice congestion information to the user terminal comprises:
sending a session establishment reject message to the user terminal, wherein the session establishment reject message comprises indication information indicating that the target network slice is congested and the backoff parameter.

12. The method according to claim 10, wherein
subsequent to the sending the message comprising the slice congestion information to the user terminal, the method further comprises:
sending a Non-access stratum (NAS) message to the user terminal, wherein the NAS message is configured to indicate that the target network slice is not congested.

13. A user terminal, characterized by comprising: a memory, a processor and a program for processing a network slice based congestion stored in the memory and executable on the processor, wherein the program for processing the network slice based congestion is executed by the processor to perform:
receiving a message sent by a network comprising slice congestion information;
backing off a target network slice corresponding to the slice congestion information, according to the slice congestion information;
wherein the receiving the message sent by the network comprising slice congestion information comprises:
receiving a session release command sent by an Access and Mobility Management Function (AMF), wherein the session release command comprises indication information indicating that the target network slice is congested and a backoff parameter, wherein the slice congestion information comprises the indication information and the backoff parameter.

14. The user terminal according to claim 13, wherein the slice congestion information is configured to indicate that the target network slice is congested, and the backing off the target network slice corresponding to the slice congestion information according to the slice congestion information comprises:
prohibiting the user terminal from initiating a session management request to the target network slice, according to the slice congestion information.

15. The user terminal according to claim 13, wherein the slice congestion information comprises a backoff time; the backing off the target network slice corresponding to the slice congestion information according to the slice congestion information comprises:
starting a backoff timer with a timing time being the backoff time, and prohibiting the user terminal from initiating a session management request to the target network slice until the backoff timer expires or stops.

16. The user terminal according to claim 13, wherein the backing off the target network slice corresponding to the slice congestion information according to the slice congestion information comprises:
in the case that the user terminal is running a backoff timer corresponding to the target network slice and a value of a backoff time in the slice congestion information is not 0 and is not a deactive value, stopping the backoff timer, and starting the backoff timer after a timing time of the backoff timer is set to be the backoff time, and prohibiting the user terminal from initiating a session management request to the target network slice, until the backoff timer expires, until the backoff timer stops, until a Public Land Mobile Network (PLMN) connected to the user terminal changes, or until a Universal Subscriber Identity Module (USIM) of the user terminal is removed;

or in the case that the user terminal is running a backoff timer corresponding to the target network slice and a value of the backoff timer in the slice congestion information is a deactive value, stopping the backoff timer, and prohibiting the user terminal from initiating a session management request to the target network slice, until the user terminal is powered off, until a PLMN connected to the user terminal changes, or until a USIM of the user terminal is removed.

17. The user terminal according to claim 16, wherein the program for processing the network slice based congestion is executed by the processor to perform, subsequent to the receiving the message sent by the network comprising slice congestion information, in the case that the user terminal is running the backoff timer corresponding to the target network slice and the slice congestion information comprises the backoff time with a value of 0, stopping the backoff timer.

18. The user terminal according to claim 15, wherein in the case that the user terminal is powered off, the backoff timer continues to run during the user terminal is powered off.

19. The user terminal according to claim 14, wherein the session management request comprises a packet data unit session connection establishment request or a packet data unit session connection modification request.

20. The user terminal according to claim 13, wherein the program for processing the network slice based congestion is executed by the processor to perform: prior to the receiving the session release command sent by the AMF, sending a session establishment request to the AMF, wherein the session establishment request is configured to request establishing a session connection to the target network slice;

the receiving the message sent by the network comprising the slice congestion information comprises:

receiving a session establishment reject message sent by the AMF, wherein the session establishment reject message comprises indication information indicating that the target network slice is congested and the backoff parameter.

* * * * *